United States Patent
Kasahara

(10) Patent No.: US 9,268,410 B2
(45) Date of Patent: Feb. 23, 2016

(54) IMAGE PROCESSING DEVICE, IMAGE PROCESSING METHOD, AND PROGRAM

(71) Applicant: Sony Corporation, Minato-ku (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 14/358,459

(22) PCT Filed: Nov. 29, 2012

(86) PCT No.: PCT/JP2012/080863
§ 371 (c)(1),
(2) Date: May 15, 2014

(87) PCT Pub. No.: WO2013/118373
PCT Pub. Date: Aug. 15, 2013

(65) Prior Publication Data
US 2014/0320404 A1    Oct. 30, 2014

(30) Foreign Application Priority Data

Feb. 10, 2012 (JP) ................................ 2012-026870

(51) Int. Cl.
*G06F 3/01* (2006.01)
*G06F 3/03* (2006.01)
(Continued)

(52) U.S. Cl.
CPC .............. *G06F 3/03* (2013.01); *G06F 1/1694* (2013.01); *G06F 3/011* (2013.01); *G06F 3/0346* (2013.01);
(Continued)

(58) Field of Classification Search
CPC ......... G06F 3/03; G06F 3/011; G06F 1/1694; G06T 19/20; G06T 2219/2004
See application file for complete search history.

(56) References Cited

U.S. PATENT DOCUMENTS

| | | | |
|---|---|---|---|
| 6,020,891 | A | 2/2000 | Rekimoto |
| 2004/0021664 | A1 | 2/2004 | Takemoto et al. |

(Continued)

FOREIGN PATENT DOCUMENTS

| | | |
|---|---|---|
| JP | 2004-62758 | 2/2004 |
| JP | 2009-93376 | 4/2009 |

(Continued)

OTHER PUBLICATIONS

International Search Report and Written Opinion issued Feb. 5, 2013, in International Application No. PCT/JP2012/080863 (with English translation).

(Continued)

*Primary Examiner* — Liliana Cerullo
(74) *Attorney, Agent, or Firm* — Oblon, McClelland, Maier & Neustadt, L.L.P.

(57) ABSTRACT

Provided is an image processing device including a recognition unit configured to recognize an environment recognition matrix representing a position and an attitude of an environment appearing in an image with respect to a position and an attitude of a terminal that has captured the image, a calculation unit configured to calculate an inverse matrix of the environment recognition matrix, and a manipulation control unit configured to control manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

11 Claims, 19 Drawing Sheets

(51) Int. Cl.
*G06F 1/16* (2006.01)
*G06T 19/20* (2011.01)
*G06F 3/0346* (2013.01)
*G06F 3/0484* (2013.01)
*G06F 3/0481* (2013.01)

(52) U.S. Cl.
CPC ........ *G06F 3/04815* (2013.01); *G06F 3/04842* (2013.01); *G06T 19/20* (2013.01); *G06T 2219/2004* (2013.01)

(56) References Cited

U.S. PATENT DOCUMENTS

| | | | |
|---|---|---|---|
| 2008/0100620 A1* | 5/2008 | Nagai et al. | 345/424 |
| 2010/0257252 A1 | 10/2010 | Dougherty et al. | |
| 2011/0298823 A1 | 12/2011 | Kitahara | |
| 2011/0304701 A1 | 12/2011 | Ito | |
| 2011/0304702 A1 | 12/2011 | Ito | |
| 2011/0304703 A1 | 12/2011 | Ito | |
| 2012/0200667 A1* | 8/2012 | Gay et al. | 348/43 |

FOREIGN PATENT DOCUMENTS

| | | |
|---|---|---|
| JP | 2010-238098 | 10/2010 |
| JP | 4696184 B1 | 3/2011 |

OTHER PUBLICATIONS

Daniel Wagner, et al., "Pose Tracking from Natural Features on Mobile Phones", ISMAR '08 Proceedings of the 7$^{th}$ IEEE/ACM International Symposium on Mixed and Augmented Reality, 2008, 10 pages.

Anton van den Hengel, et al., "In Situ Image-based Modeling", IEEE International Symposium on Mixed and Augmented Reality 2009, Oct. 19-22, 2009, Science and Technology Proceedings, 4 pages.

Extended European Search Report issued Sep. 28, 2015 to European Patent Application No. 12868009.7.

Wolfgang Hurst et al., "Gesture-based interaction via finger tracking for mobile augmented reality", Multimedia Tools and Applications, Kluwer Academic Publishers, BO, vol. 62, No. 1, Jan. 18, 2012, pp. 233-258.

Julie Carmigniani et al., "Augmented reality technologies, systems and applications", Multimedia Tools and Applications, Kluwer Academic Publishers, BO, vol. 51, No. 1, Dec. 14, 2010, pp. 341-377.

* cited by examiner

IMAGE PROCESSING DEVICE, IMAGE PROCESSING METHOD, AND PROGRAM

TECHNICAL FIELD

The present disclosure relates to an image processing device, an image processing method, and a program.

BACKGROUND ART

In recent years, a technology called augmented reality (AR) in which a real world with additional information overlaid thereon is presented to a user has been drawing. Information presented to a user in the AR technology is also called an annotation, and can be visualized and obtained using virtual objects in various forms such as text, icons, or animations.

Non-Patent Literature 1 below shows an example of a technology for modeling a real space in a stage before a virtual object is arranged. Non-Patent Literature 2 below shows an example of a technology that uses a natural marker with the objective of calculating the position and the attitude of an imaging device that are necessary for overlaying a virtual object on a captured image.

The AR technology can also be used in an application that includes an interaction with a user. For example, Patent Literature 1 described below discloses a technology for displaying an icon that can be manipulated by a user as a virtual object.

CITATION LIST

Non-Patent Literature

Non-Patent Literature 1: A. van den Hengel, R. Hill, B. Ward and A. Dick, "In Situ Image-based Modeling" (In Proc. 8th IEEE International Symposium on Mixed and Augmented Reality, 2009)

Non-Patent Literature 2: W. Daniel, G. Reitmayr, A. Mulloni, T. Drummond, and D. Schmalstieg, "Pose Tracking from Natural Features on Mobile Phones" (In Proc. 7th IEEE International Symposium on Mixed and Augmented Reality, 2008) Patent Literature Patent Literature 1: JP 2010-238098A

SUMMARY OF INVENTION

Technical Problem

However, in the technology disclosed in Patent Literature 1 described above, the virtual object only moves according to manipulation of the user on a two-dimensional screen. For this reason, it is difficult to say that a sense of reality that is one advantage of the AR technology is sufficiently realized. In order to obtain a sense of reality in an interaction with a user, it is desirable to provide a mechanism that enables free manipulation of a virtual object in a three-dimensional space.

Solution to Problem

According to the present disclosure, there is provided an image processing device including a recognition unit configured to recognize an environment recognition matrix representing a position and an attitude of an environment appearing in an image with respect to a position and an attitude of a terminal that has captured the image, a calculation unit configured to calculate an inverse matrix of the environment recognition matrix, and a manipulation control unit configured to control manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

According to the present disclosure, there is provided an image processing method including recognizing an environment recognition matrix representing a position and an attitude of an environment appearing in an image with respect to a position and an attitude of a terminal that has captured the image, calculating an inverse matrix of the environment recognition matrix, and controlling manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

According to the present disclosure, there is provided a program causing a computer to function as a recognition unit configured to recognize an environment recognition matrix representing a position and an attitude of an environment appearing in an image with respect to a position and an attitude of a terminal that has captured the image, a calculation unit configured to calculate an inverse matrix of the environment recognition matrix, and a manipulation control unit configured to control manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

Advantageous Effects of Invention

In the technology according to the present disclosure, a mechanism that enables free manipulation of a virtual object in a three-dimensional space is provided.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In addition, description will be provided in the following order.
1. Basic principle
1-1. Overview
1-2. Basic parameters
1-3. Example of a three-dimensional manipulation amount
2. Configuration example of an image processing device
2-1. Hardware configuration
2-2. Functional configuration
2-3. Manipulation scenarios
2-4. Process flow
2-5. Variation of display
2-6. Sharing of a virtual object
3. Conclusion <1. Basic Principle>

First, the basic principle of the technology according to the present disclosure will be described using FIGS. 1 to 8.

[1-1. Overview]

Figure 1:
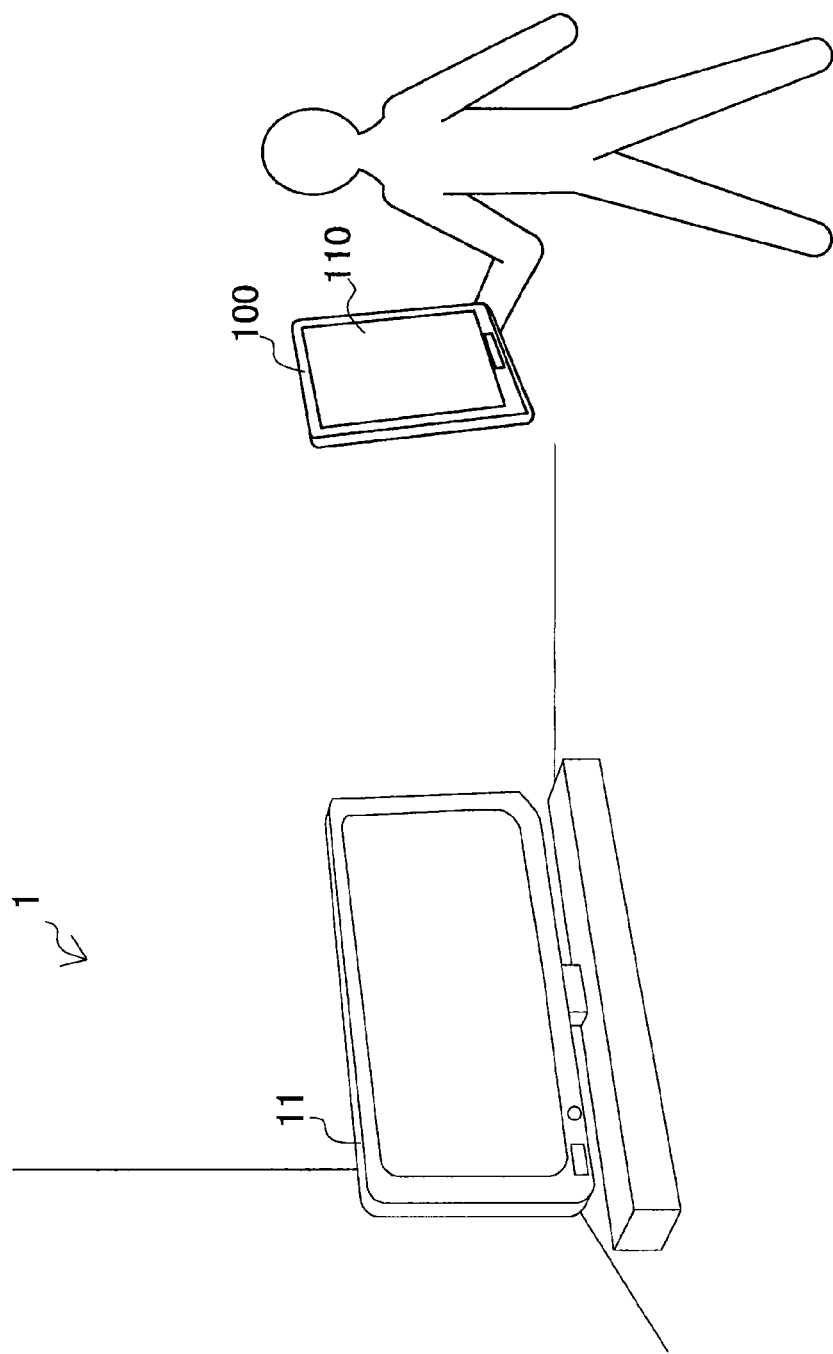
FIG. 1 is an illustrative diagram showing an example of an environment to which the technology according to the present disclosure can be applied.

FIG. 1 is an illustrative diagram showing an example of an environment to which the technology according to the present disclosure can be applied. Referring to FIG. 1, an environment 1 and an image processing device 100 that captures an image of the environment 1 are shown. In the example in FIG. 1, a real object 11 is present in the environment 1. The image processing device 100 typically includes an imaging unit (not shown) and a display unit 110. The imaging unit of the image processing device 100 captures a series of images that constitute a video reflecting the environment 1. The image processing device 100 then performs image processing using the captured image as an input image, and arranges a virtual object in a three-dimensional space. A user manipulates the virtual object by operating the image processing device 100 as will be described later. The display unit 110 of the image processing device 100 displays an output image with the virtual object overlaid thereon.

The image processing device 100 arranges a virtual object in a given reference environment. That is, the position and the attitude of the virtual object are defined in a coordinate system (hereinafter referred to as a reference coordinate system) associated with the reference environment. In the following description, the environment 1 including the real object 11 is assumed to be the reference environment. In reality, the reference environment may be an arbitrary environment, whether indoors or outdoors. As another embodiment, a single real object having a coordinate system specific to the real object may be treated as the reference environment. In such a case, the coordinate system specific to the real object is the reference coordinate system.

FIG. 1 shows a tablet PC as an example of the image processing device 100. However, the image processing device 100 is not limited thereto. The image processing device 100 may be, for example, a notebook PC, a pocket PC, a smartphone, a game terminal, a PND (Portable Navigation Device), a content player, or a digital home appliance.

[1-2. Basic Parameters]

In the technology according to the present disclosure, the position and the attitude of a virtual object arranged in the reference environment are determined through calculation using several parameters. The most basic parameter is an environment recognition matrix.

(1) Environment Recognition Matrix

An environment recognition matrix is a matrix representing the position and the attitude of the reference environment with respect to the position and the attitude of a terminal, which has captured an input image, in the reference environment. The environment recognition matrix may typically be a coordinate transformation matrix representing parallel movement, rotation, and scaling (enlargement/reduction) in the three-dimensional space (e.g., a 4×4 homogeneous transformation matrix).

Figure 2:
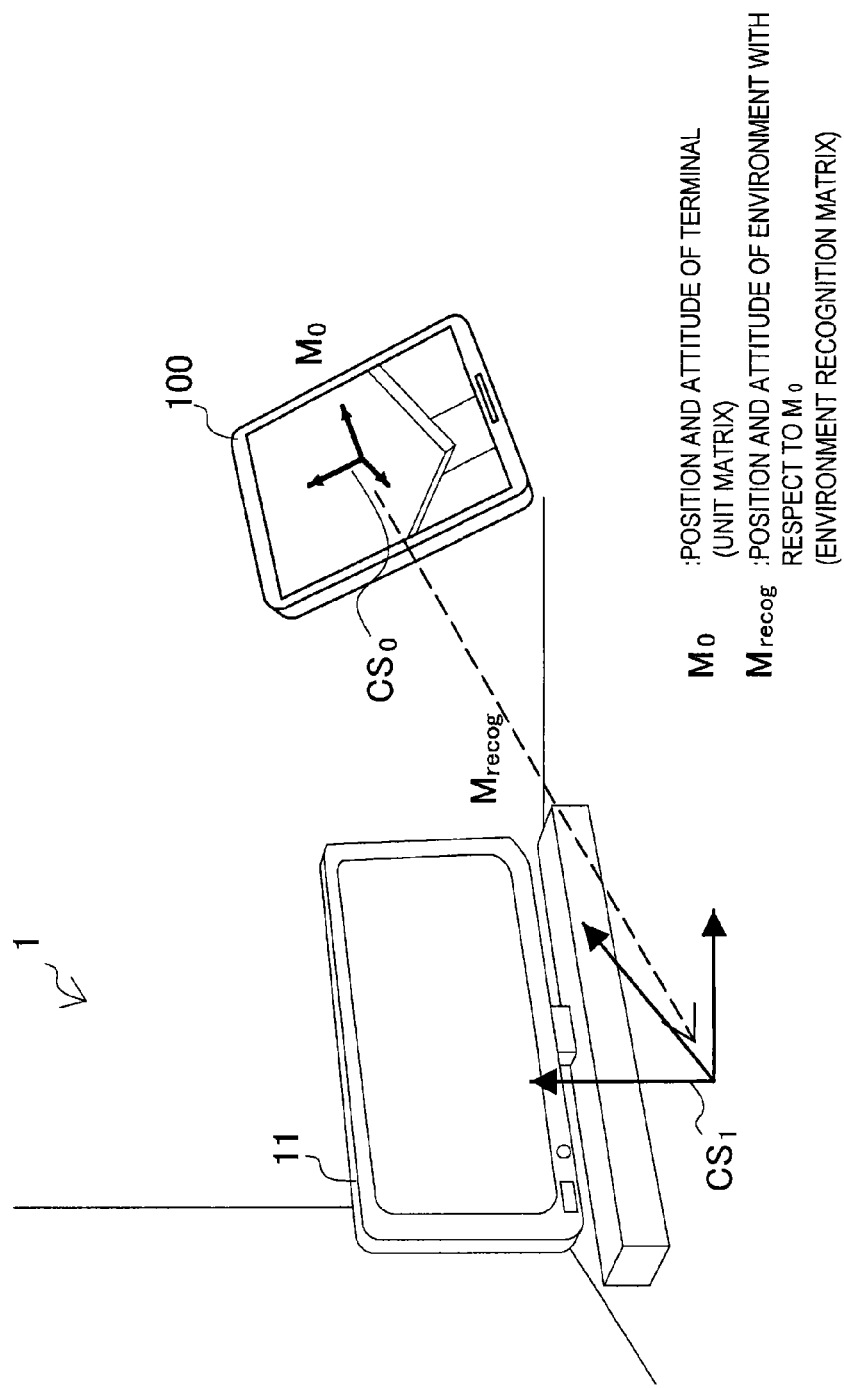
FIG. 2 is a first illustrative diagram for describing a basic principle of the technology according to the present disclosure.

Referring to FIG. 2, a reference coordinate system $CS_1$ associated with the reference environment 1 and a device-specific coordinate system $CS_0$ of the image processing device 100 are shown. The device-specific coordinate system $CS_0$ can be configured by, for example, a two-dimensional coordinate axis and a depth axis of a screen of the display unit 110. The relative position and attitude of the reference coordinate system $CS_1$ with respect to the device-specific coordinate system $CS_0$ of the image processing device 100 can be recognized using an input image by utilizing a known image recognition technology. The image recognition technology utilized herein may be, for example, a SfM (Structure from Motion) method, a SLAM (Simultaneous Localization And Mapping) method, or a method described in Non-Patent Literature 1 or 2 above. Alternatively, a simple environment recognition technology that uses an infrared sensor may also be utilized.

Herein, it is assumed that the position and the attitude of the device-specific coordinate system $CS_0$ of the image processing device 100 are represented by a unit matrix $M_0$. Then, it becomes possible to recognize a given position and attitude in the reference environment 1 as coordinate transformation (parallel movement, rotation, and scaling) from the matrix $M_0$. Thus, a set of a position and an attitude can be represented by a single coordinate transformation matrix. The aforementioned environment recognition matrix is one of such coordinate transformation matrices. An environment recognition matrix $M_{recog}$ represents the position and the attitude of the reference coordinate system $CS_1$ with respect to the position and the attitude of the image processing device 100 (e.g., the unit matrix $M_0$).

(2) Manipulation Arrangement Matrix

Figure 3:
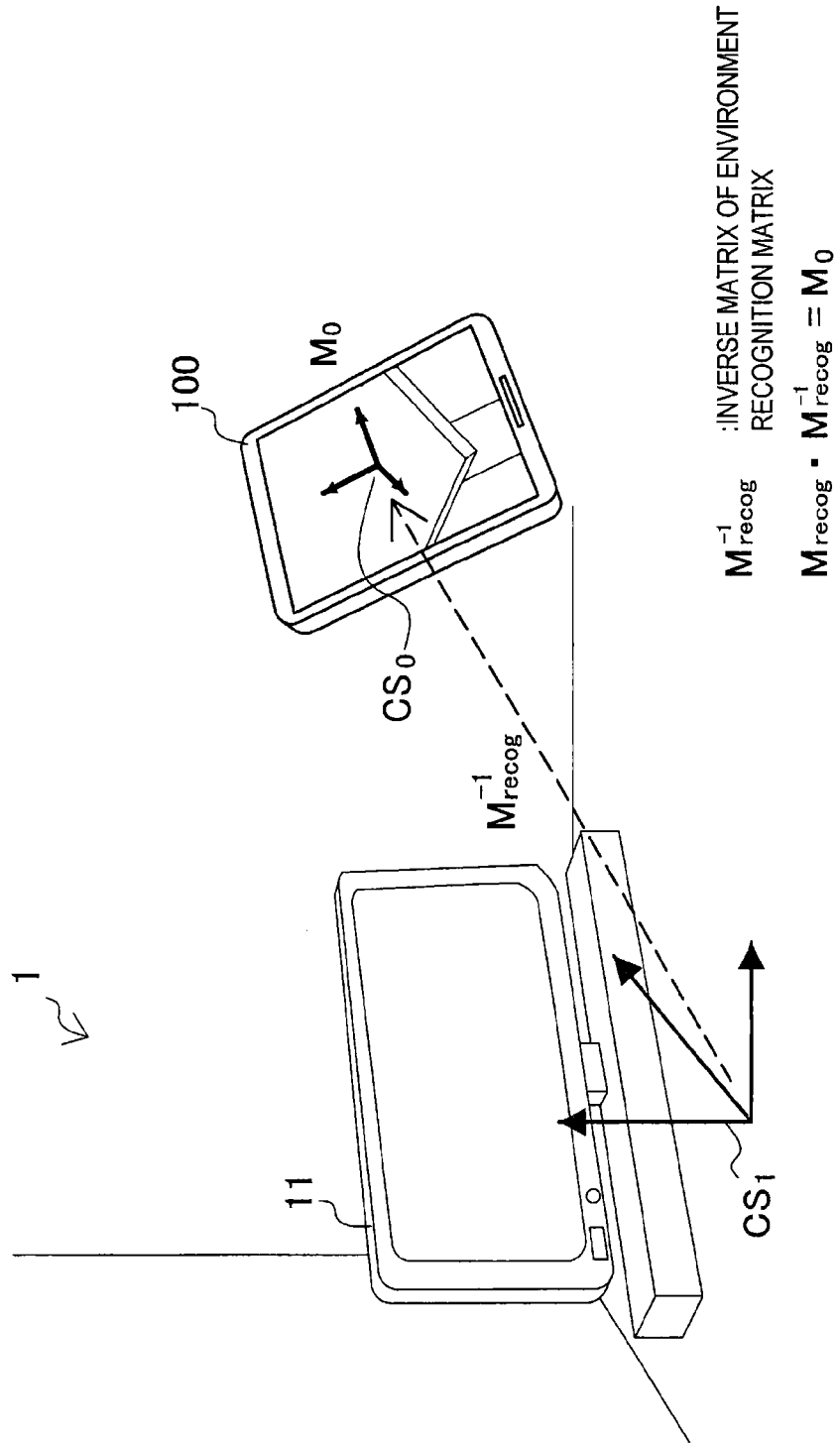
FIG. 3 is a second illustrative diagram for describing the basic principle of the technology according to the present disclosure.

Under the aforementioned premise, an inverse matrix $M_{recog}^{-1}$ of the environment recognition matrix $M_{recog}$ is a matrix representing the position and the attitude of the image processing device 100 with respect to the position and the attitude of the reference coordinate system $CS_1$. FIG. 3 conceptually shows coordinate transformation represented by the inverse matrix $M_{recog}^{-1}$ of the environment recognition matrix.

A manipulation arrangement matrix $M_{mobile}$ is a matrix representing the position and the attitude of the image processing device 100 moved by a user for manipulating a virtual object. Note that, unless particularly specified as "parallel" movement in the present specification, the term "movement" is assumed to include both parallel movement and rotation. The manipulation arrangement matrix $M_{mobile}$ may be, for example, equal to the inverse matrix $M_{recog}^{-1}$ of the environment recognition matrix as in the following formula.

[Math 1]

$$M_{mobile} = M_{recog}^{-1} \quad (1)$$

Figure 4:
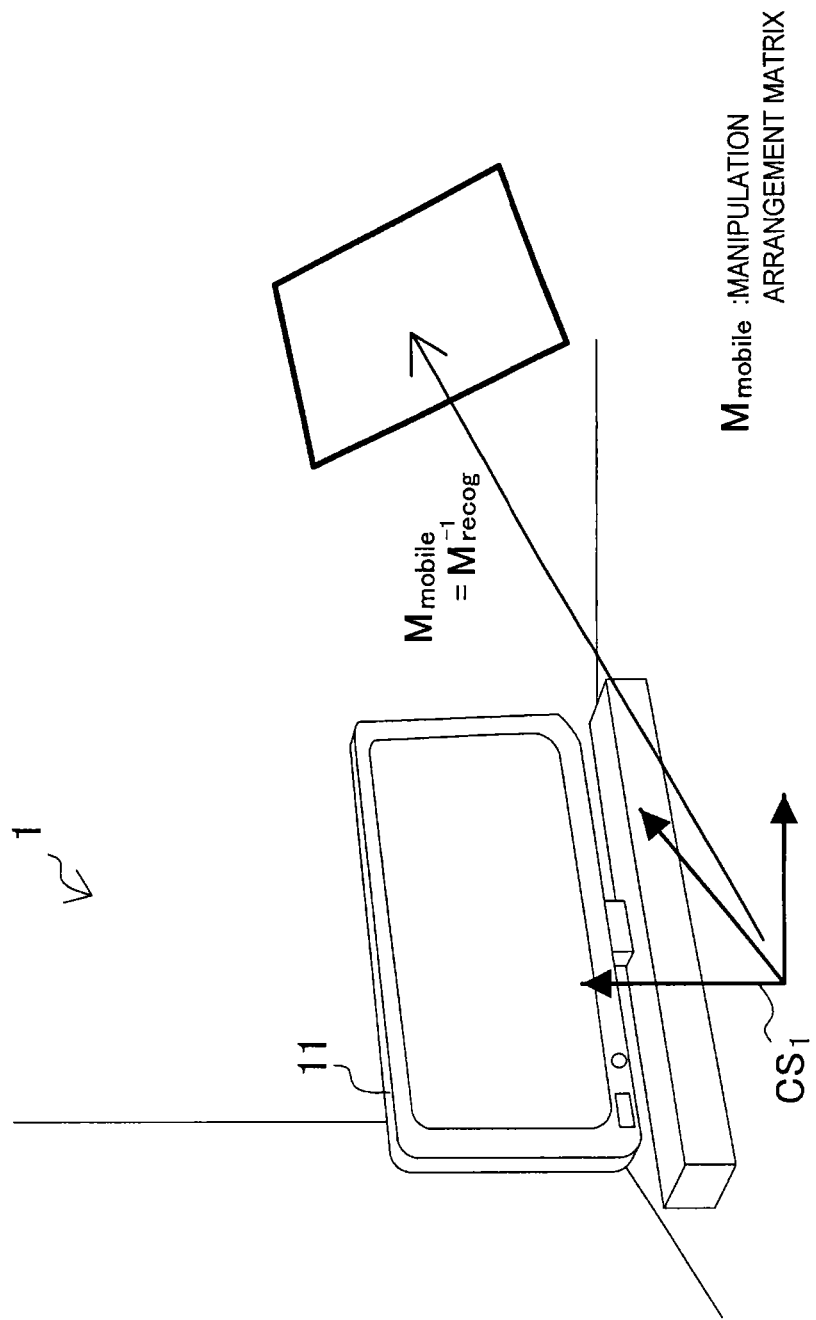
FIG. 4 is a third illustrative diagram for describing the basic principle of the technology according to the present disclosure.

FIG. 4 conceptually shows coordinate transformation expressed by the manipulation arrangement matrix $M_{mobile}$ when formula (1) is employed. However, in order to facilitate adjusting of a manipulation position, an offset matrix that will be described next may be used.

(3) Offset Matrix

Figure 5:
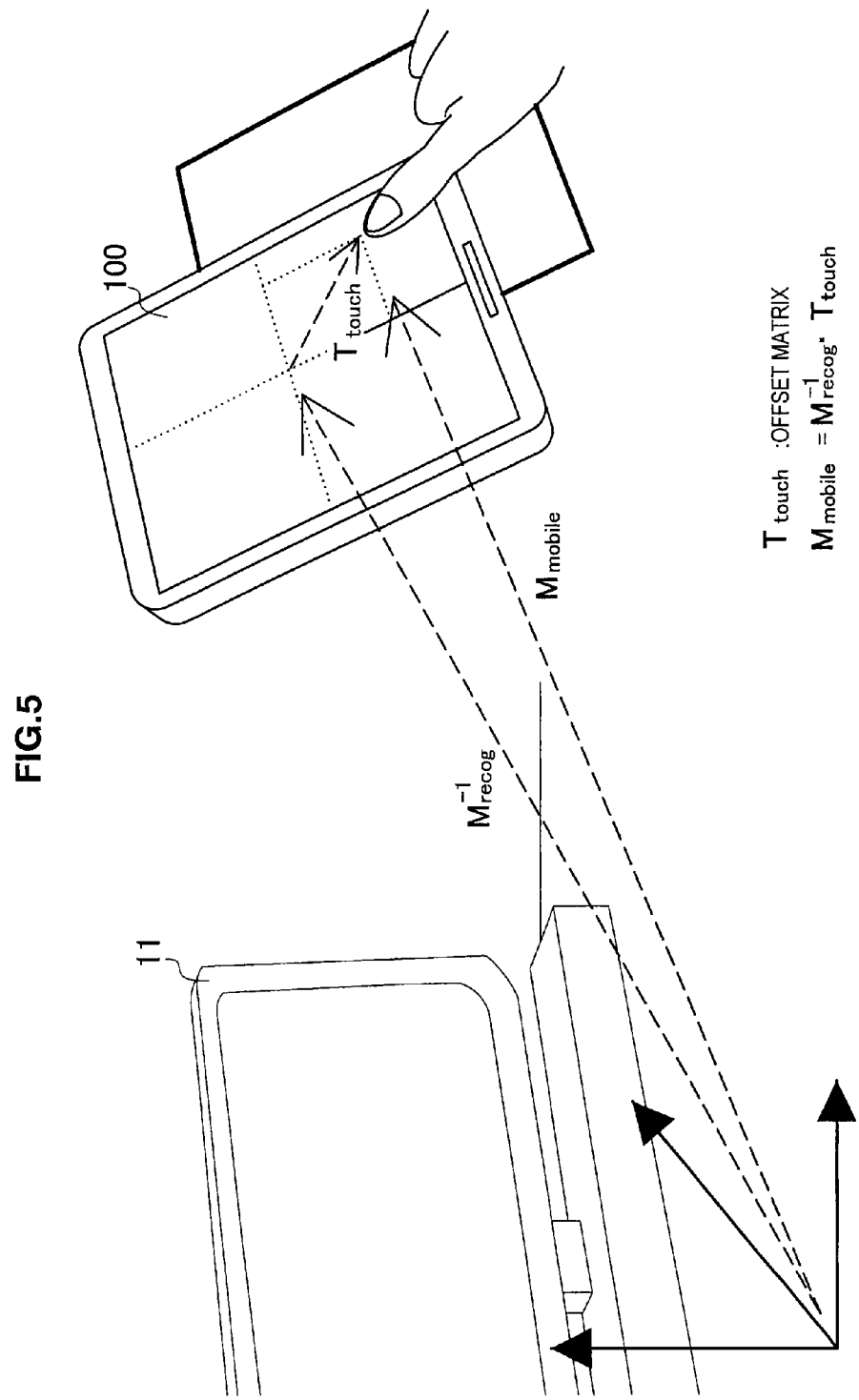
FIG. 5 is a fourth illustrative diagram for describing the basic principle of the technology according to the present disclosure.

FIG. 5 conceptually shows the manipulation arrangement matrix $M_{mobile}$ decided by including an offset matrix $T_{touch}$. The offset matrix $T_{touch}$ is a coordinate transformation matrix decided according to a user input position on the screen of the image processing device 100, representing parallel movement in a direction of the screen. When the offset matrix $T_{touch}$ is included, the manipulation arrangement matrix $M_{mobile}$ can be calculated as in the following formula.

[Math 2]

$$M_{mobile} = M_{recog}^{-1} \cdot T_{touch} \quad (2)$$

When the offset matrix $T_{touch}$ is included as above, it is easy for a user to finely adjust a manipulation position by performing manipulation (for example, touching, clicking, or the like) in a desired position on the screen, instead of moving the image processing device 100.

[1-3. Example of a Three-Dimensional Manipulation Amount]

Here, a user is assumed to move the image processing device 100 from a time t1 to a time t2. In this case, a manipulation arrangement matrix $M_{mobile}(t1)$ at the time t1 and a manipulation arrangement matrix $M_{mobile}(t2)$ at the time t2 can be calculated following the principle described above. The difference of the position represented by the manipulation arrangement matrix $M_{mobile}(t1)$ and the position represented by the manipulation arrangement matrix $M_{mobile}(t2)$ indicates a parallel movement amount corresponding to parallel movement of the image processing device 100 (and a change of the user input position on the screen) from the time t1 to the time t2. The difference of the attitude represented by the manipulation arrangement matrix $M_{mobile}(t1)$ and the attitude represented by the manipulation arrangement matrix $M_{mobile}(t2)$ indicates a rotation amount corresponding to rotation of the image processing device 100 from the time t1 to the time t2. In the technology according to the present disclosure, the virtual object arranged in the reference environment is three-dimensionally manipulated according to the parallel movement amount and the rotation amount.

Figure 6:
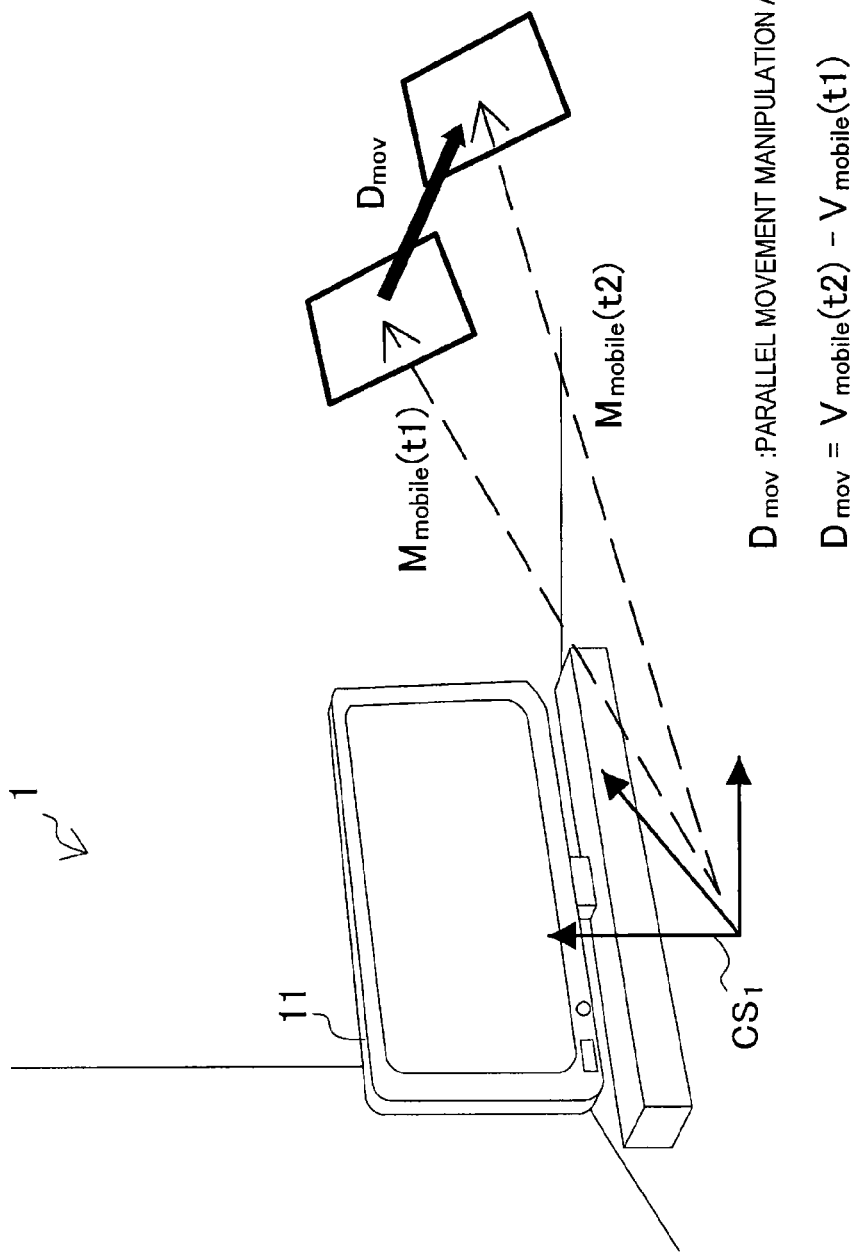
FIG. 6 is an illustrative diagram for describing a first example of a three-dimensional manipulation amount decided based on the technology according to the present disclosure.

In the example of FIG. 6, the manipulation arrangement matrix $M_{mobile}(t1)$ is first decided at the time t1. In addition, the manipulation arrangement matrix $M_{mobile}(t2)$ is decided at the succeeding time t2. Based on the manipulation arrangement matrixes, a parallel movement manipulation amount $D_{mov}$ is calculated as in the following formula.

[Math 3]

$$D_{mov} = V_{mobile}(t2) - V_{mobile}(t1) \quad (3)$$

Figure 7:
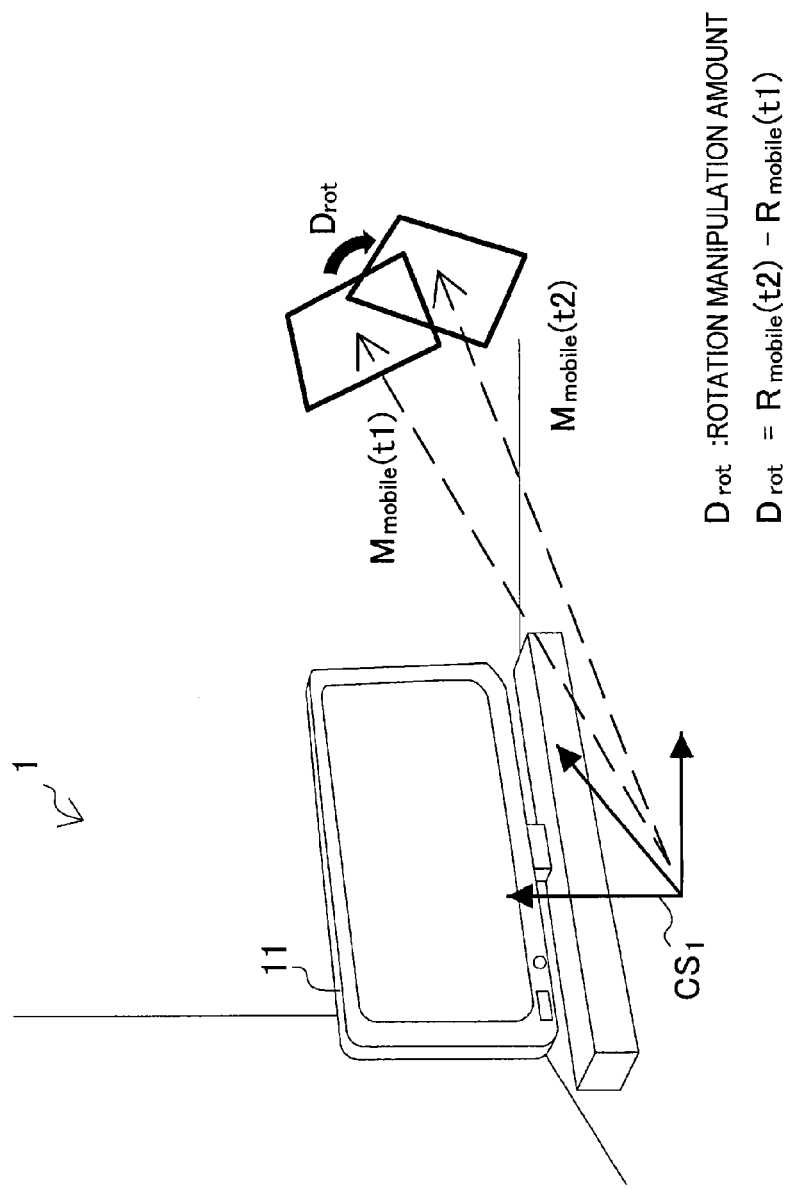
FIG. 7 is an illustrative diagram for describing a second example of the three-dimensional manipulation amount decided based on the technology according to the present disclosure.

In formula (3), $V_{mobile}(t)$ is assumed to represent a parallel movement component of the manipulation arrangement matrix $M_{mobile}(t)$. In the example of FIG. 7, a rotation manipulation amount $D_{rot}$ is calculated based on the two manipulation arrangement matrixes $M_{mobile}(t1)$ and $M_{mobile}(t2)$ as in the following formula.

[Math 4]

$$D_{rot} = R_{mobile}(t2) - R_{mobile}(t1) \quad (4)$$

In formula (4), $R_{mobile}(t)$ is assumed to represent a rotation component of the manipulation arrangement matrix $M_{mobile}(t)$. Note that formula (3) and formula (4) are mere examples. For example, the right side of formula (3) or formula (4) may be multiplied by a coefficient in order to increase or decrease the manipulation amount.

Figure 8:
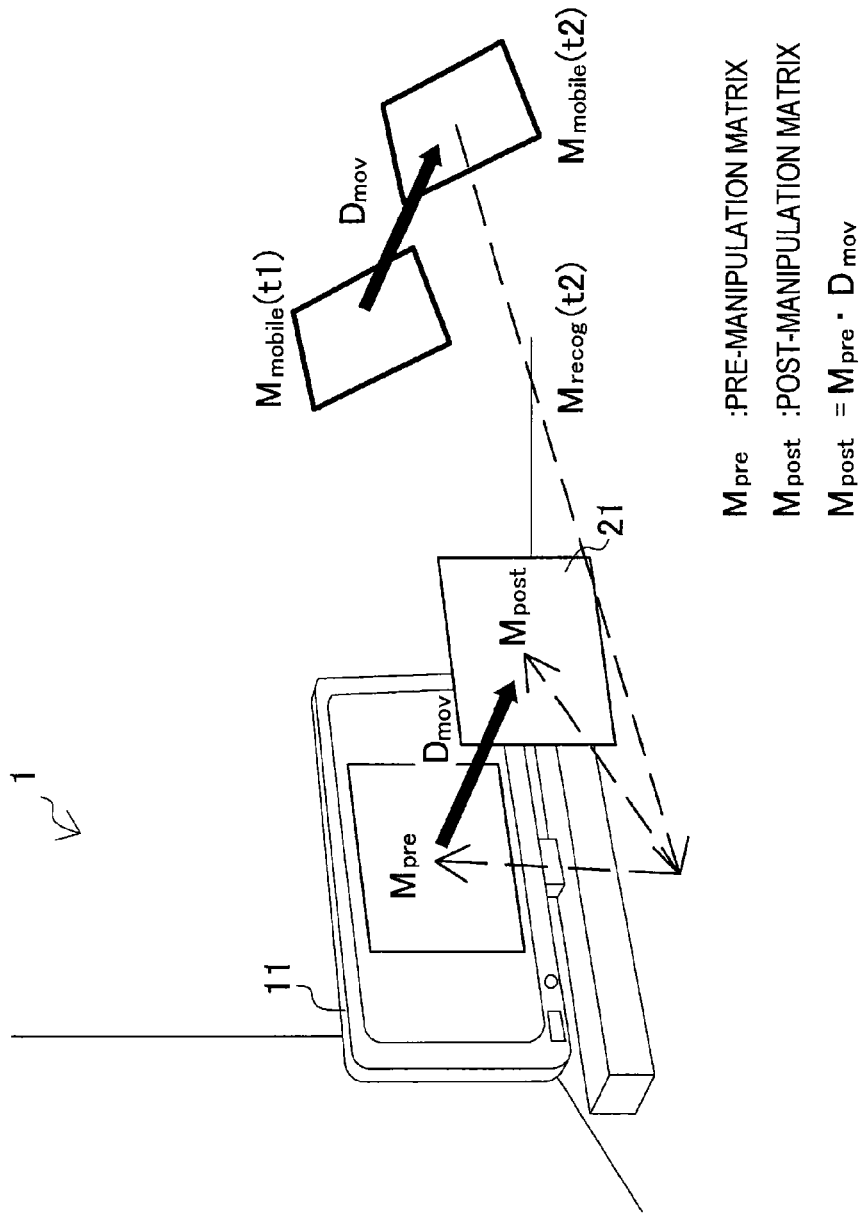
FIG. 8 is an illustrative diagram for describing an example of manipulation of a virtual object executed based on the technology according to the present disclosure.

FIG. 8 is an illustrative diagram for describing an example of manipulation of a virtual object executed based on the technology according to the present disclosure. Here, an AR application that enables drawing of a virtual object from the real object 11 is assumed as an example. A pre-manipulation matrix $M_{pre}$ shown in FIG. 8 is equivalent to a matrix representing a position and an attitude of the real object 11 recognized by the image processing device 100. The virtual object 21 is a virtual object associated with the real object 11. It is assumed that, for example, a user moves the image processing device 100 as shown in the drawing from the time t1 to the time t2 after the image processing device 100 recognizes the position and the attitude of the real object 11. Then, the image processing device 100 decides a three-dimensional manipulation amount according to the difference between the manipulation arrangement matrix $M_{mobile}(t1)$ and the manipulation arrangement matrix $M_{mobile}(t2)$. In the example of FIG. 8, the parallel movement manipulation amount $D_{mov}$ has been decided. In addition, the image processing device 100 causes the virtual object 21 to move according to the parallel movement manipulation amount $D_{mov}$. When the position and the attitude serving as the origin of manipulation are represented by the pre-manipulation matrix $M_{pre}$ as shown in the example of FIG. 8, a post-manipulation matrix $M_{post}$ representing a position and an attitude of the virtual object 21 after the manipulation is calculated as follows.

[Math 5]

$$M_{post} = M_{pre} \cdot D_{mov} \quad (5)$$

Note that, when rotation is performed instead of parallel movement, the post-manipulation matrix $M_{post}$ is calculated as in formula (6). When both parallel movement and rotation are performed, the post-manipulation matrix $M_{post}$ is calculated as in formula (7).

[Math 6]

$$M_{post} = M_{pre} \cdot D_{rot} \quad (6)$$

$$M_{post} = M_{pre} \cdot D_{mov} \cdot D_{rot} \quad (7)$$

In the example of FIG. 8, a way of viewing the virtual object 21 from the image processing device 100 at the time t2 can be expressed as the following coordinate transformation which corresponds to the product of the post-manipulation matrix $M_{post}$ and an environment recognition matrix $M_{recog}$(t2) at the time t2.

[Math 7]

$$M_{recog}(t2) \cdot M_{post} \quad (8)$$

According to the principle described in the present section, the user can freely designate a three-dimensional manipulation amount by manipulating a terminal such as the image processing device 100 while moving it. Hereinbelow, an example of a configuration of the image processing device 100 based on the above-described principle will be described in detail.

<2. Configuration Example of the Image Processing Device>

[2-1. Hardware Configuration]

Figure 9:
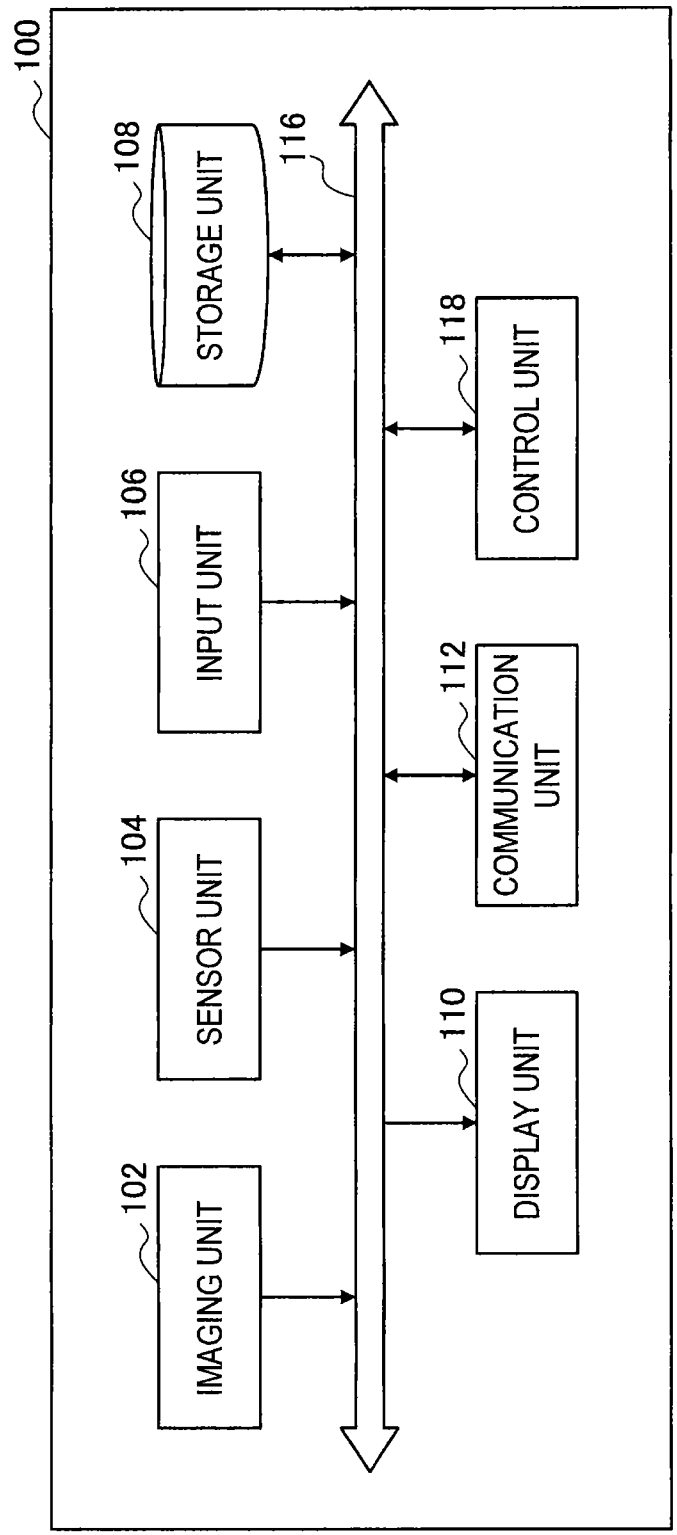
FIG. 9 is a block diagram showing an example of a hardware configuration of an image processing device according to an embodiment.

FIG. 9 is a block diagram showing an example of a hardware configuration of the image processing device 100 according to an embodiment. Referring to FIG. 9, the image processing device 100 includes an imaging unit 102, a sensor unit 104, an input unit 106, a storage unit 108, a display unit 110, a communication unit 112, a bus 116, and a control unit 118.

(1) Imaging Unit

The imaging unit 102 is a camera module that captures an image. The imaging unit 102 captures an image of a real space using an image sensor such as a CCD (Charge Coupled Device) or a CMOS (Complementary Metal Oxide Semiconductor) to generate a captured image. A series of captured images generated by the imaging unit 102 constitutes a video. Note that the imaging unit 102 may not be a part of the image processing device 100. For example, an imaging device connected to the image processing device 100 by wire or wirelessly may be treated as the imaging unit 102. In addition, the imaging unit 102 may include a depth sensor that measures the distance between the imaging unit 102 and a photographic subject for each pixel. The depth data output from the depth sensor can be used to recognize the environment.

(2) Sensor Unit

The sensor unit 104 can include various sensors such as a positioning sensor, an acceleration sensor, and a gyro sensor. The measurement result obtained by the sensor unit 104 may be used for various applications such as for assisting in the recognition of an environment, acquiring data on a geographical location, or detecting a user input. Note that the sensor unit 104 may be omitted from the configuration of the image processing device 100.

(3) Input Unit

The input unit 106 is an input device used for a user to operate the image processing device 100 or input information to the image processing device 100. The input unit 106 may include, for example, a touch sensor that detects a touch of a user on the screen of the display unit 110. Alternatively (or additionally), the input unit 106 may include a pointing device such as a mouse or a touch pad. Further, the input unit 106 may include other types of input device such as a keyboard, a keypad, a button, or a switch.

(4) Storage Unit

The storage unit 108 includes a storage medium such as a semiconductor memory or a hard disk, and stores programs and data for processes to be performed by the image processing device 100. Data stored in the storage unit 108 can include, for example, data on the captured image, sensor data, and data in a database (DB) that will be described below. Note that a part of a program and data described in the present specification may also be acquired from an external data source (e.g., a data server, a network storage, or an external memory) without being stored in the storage unit 108.

(5) Display Unit

The display unit 110 is a display module including a display such as an LCD (Liquid Crystal Display), an OLED (Organic light-Emitting Diode), or a CRT (Cathode Ray Tube). The display unit 110 is used to display an output image generated by, for example, the image processing device 100. Note that the display unit 110 may not be a part of the image processing device 100, either. For example, a display device connected to the image processing device 100 by wire or wirelessly may be treated as the display unit 110.

(6) Communication Unit

The communication unit 112 is a communication interface that intermediates the communication of the image processing device 100 with another device. The communication unit 112 supports a given wireless communication protocol or a wired communication protocol, and establishes communication connection with another device.

(7) Bus

The bus 116 connects the imaging unit 102, the sensor unit 104, the input unit 106, the storage unit 108, the display unit 110, the communication unit 112, and the control unit 118 to one another.

(8) Control Unit

The control unit 118 corresponds to a processor such as a CPU (Central Processing Unit) or a DSP (Digital Signal Processor). The control unit 118 causes various functions of the image processing device 100 described below to operate by executing programs stored in the storage unit 108 or another storage medium.

[2-2. Functional Configuration]

Figure 10:
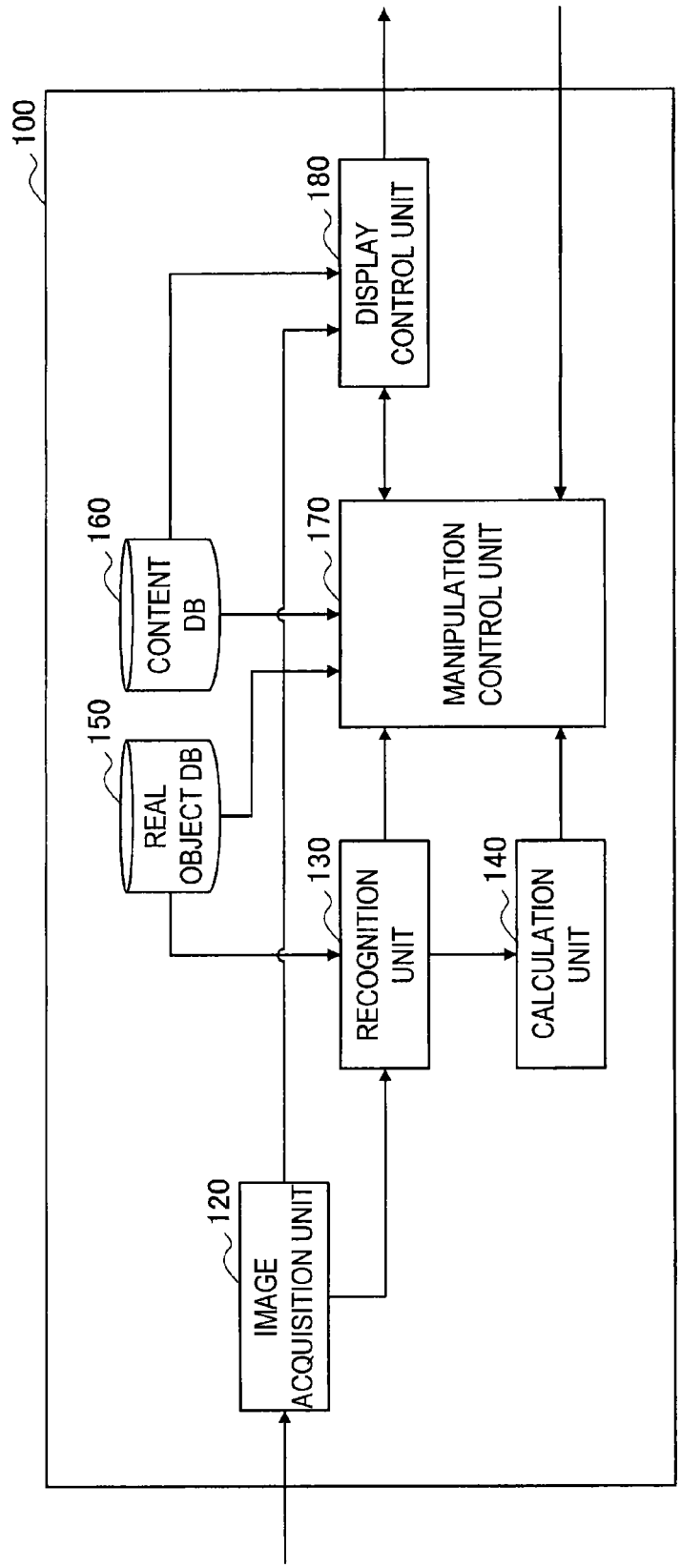
FIG. 10 is a block diagram showing an example of a configuration of a logical function of the image processing device according to an embodiment.

FIG. 10 is a block diagram showing an example of a configuration of the logical function implemented by the storage unit 108 and the control unit 118 of the image processing device 100 shown in FIG. 9. Referring to FIG. 10, the image processing device 100 includes an image acquisition unit 120, a recognition unit 130, a calculation unit 140, a real object DB 150, a content DB 160, a manipulation control unit 170, and a display control unit 180.

(1) Image Acquisition Unit

The image acquisition unit 120 acquires a captured image generated by the imaging unit 102 as an input image. The input image acquired by the image acquisition unit 120 may be an individual frame that constitutes a video of the real space. The image acquisition unit 120 outputs the acquired input image to the recognition unit 130 and the display control unit 180.

(2) Recognition Unit

The recognition unit 130 recognizes the aforementioned environment recognition matrix representing the position and the attitude of the reference environment using the input image acquired from the image acquisition unit 120. The recognition unit 130 can utilize a known image recognition technology such as the SfM method or the SLAM method to recognize the environment recognition matrix. Alternatively or additionally, the recognition unit 130 may recognize the environment recognition matrix on the basis of depth data from the depth sensor provided in the imaging unit 102. In addition, the recognition unit 130 may recognize the environment recognition matrix on the basis of output data from an environment recognition system such as an infrared distance measuring system or a motion capturing system.

For example, when the SLAM method is utilized, the recognition unit 130 updates the position, attitude, speed, and angular velocity of the terminal, and a state variable including the position of one or more feature points in the input image for each frame on the basis of the principle of an extended Kalman filter. Accordingly, the position and the attitude of the reference environment with respect to the position and the attitude of the terminal can be recognized using an input image from a monocular camera. The recognition unit 130 represents the recognized position and attitude of the reference environment using an environment recognition matrix $M_{recog}$ that corresponds to coordinate transformation from the position and the attitude of the terminal. Note that the details of the SLAM method are described in "Real-Time Simultaneous Localization and Mapping with a Single Camera" (Andrew J. Davison, Proceedings of the 9$^{th}$ IEEE International Conference on Computer Vision Volume 2, 2003, pp. 1403-1410).

The recognition unit 130 outputs the environment recognition matrix $M_{recog}$ recognized as above to the calculation unit 140 and the manipulation control unit 170.

In addition, when the position and the attitude of the virtual object are associated with the position and the attitude of the real object in the reference environment as shown in the example of FIG. 8, the recognition unit 130 also recognizes the position and the attitude of the real object in the input image. For example, the real object DB 150 stores each piece of known feature amount data of one or more real objects and identifiers of the real objects in advance. In addition, the recognition unit 130 can identify the real object in the input image by comparing the feature amount data extracted from the input image to the feature amount data stored in the real object DB 150. The recognition unit 130 recognizes a coordinate transformation matrix that represents the position and the attitude of the real object identified as above in the reference coordinate system as being the same as the environment recognition matrix $M_{recog}$.

(3) Calculation Unit

The calculation unit 140 calculates an inverse matrix $M_{recog}^{-1}$ of the environment recognition matrix input from the recognition unit 130. For example, the environment recognition matrix $M_{recog}$ is a 4×4 homogeneous transformation matrix. Thus, the inverse matrix $M_{recog}^{-1}$ of the environment recognition matrix is also a 4×4 homogeneous transformation matrix and satisfies $M_{recog} \cdot M_{recog}^{-1} = M_0$ (unit matrix). The inverse matrix $M_{recog}^{-1}$ of the environment recognition matrix represents coordinate transformation from the position and the attitude of the reference coordinate system to the position and the attitude of the terminal. The calculation unit 140 outputs the calculated inverse matrix $M_{recog}^{-1}$ of the environment recognition matrix to the manipulation control unit 170.

(4) Real Object DB

The real object DB 150 stores known feature amount data and an identifier of a real object to be recognized according to the purpose of the AR application in advance as described above.

(5) Content DB

The content DB 160 stores an identifier and attribute data of a virtual object that can be manipulated by a user and an identifier of an associated real object in advance. The attribute data of a virtual object can include a display attribute (for example, the initial value, shape, color, and the like of the position and the attitude) of the virtual object and a manipulation attribute (for example, whether or not parallel movement and rotation are possible) of the virtual object.

(6) Manipulation Control Unit 170

The manipulation control unit 170 controls manipulation of the virtual object arranged in the environment of the input image using the various parameters described above.

For example, the manipulation control unit 170 decides the manipulation arrangement matrix $M_{mobile}$ representing the position and the attitude of manipulation in the three-dimensional reference environment based on the inverse matrix $M_{recog}^{-1}$ of the environment recognition matrix at a first time point corresponding to a start of the manipulation. The manipulation control unit 170 may decide the manipulation arrangement matrix $M_{mobile}$ equal to the inverse matrix $M_{recog}^{-1}$ of the environment recognition matrix according to, for example, formula (1) described above. In addition, the manipulation control unit 170 may decide the manipulation arrangement matrix $M_{mobile}$ by including an offset matrix according to a user input position on a screen of a terminal according to formula (2) described above.

In addition, the manipulation control unit 170 specifies a virtual object to be manipulated. Such a virtual object to be manipulated may be an object associated with a real object selected from real objects in an input image based on a certain criterion. In addition, such a virtual object to be manipulated may be an object designated by a user (for example, through touching, clicking, or the like) on a screen.

Furthermore, the manipulation control unit 170 decides the manipulation arrangement matrix $M_{mobile}$ representing the position and the attitude of manipulation in the three-dimensional reference environment again according to formula (1) or formula (2) described above based on the inverse matrix $M_{recog}^{-1}$ of the environment recognition matrix at a second time point corresponding to an end of the manipulation (or which may be in the middle of the manipulation).

In addition, the manipulation control unit 170 decides a manipulation amount of a virtual object according to the difference of the two manipulation arrangement matrixes $M_{mobile}$ at the times of the start of the manipulation and the end of the manipulation. Data stored by the content DB 160 is assumed to indicate that, for example, a virtual object to be manipulated can make parallel movement. Then, the manipulation control unit 170 calculates the parallel movement manipulation amount $D_{mov}$ according to the difference between the parallel movement components of the two manipulation arrangement matrixes $M_{mobile}$. In addition, data stored by the content DB 160 is assumed to indicate that the virtual object to be manipulated can be rotated. Then, the manipulation control unit 170 calculates a rotation manipulation amount $D_{rot}$ according to the difference between the rotation components of the two manipulation arrangement matrixes $M_{mobile}$.

When the manipulation amounts have been calculated, the manipulation control unit 170 changes arrangement of the virtual object to be manipulated according to the computed manipulation amounts. The relationship between arrangement of the virtual object before and after the manipulation may be any one of formula (6) to formula (8) described above.

The manipulation control unit 170 outputs a coordinate transformation matrix (post-manipulation matrix $M_{post}$) representing arrangement of the virtual object updated according to manipulation by the user as described above to the display control unit 180.

The first time point described above corresponding to the start of the manipulation may be the time point at which a first user input is detected in the terminal, and the second time point described above corresponding to the end of the manipulation may be the time point at which a second user input is detected in the terminal. By clearly informing the user of a timing of manipulation as described above, the manipulation control unit 170 can discriminate manipulation of the virtual object from an intended operation by the user and another operation. Such first and second user inputs may be defined to correspond to the start and the end of a series of manipulation. A series of manipulation can be equivalent to, for example, touching or dragging. Typically, a start of touching or dragging is detected as an event of pressing (Press), and an end of touching or dragging is detected as an event of releasing (Release). According to such a user interface, through simple manipulation of moving the terminal while touching (or dragging) the screen, the user can cause the virtual object to undergo three-dimensional parallel movement and rotation as intended.

In addition, the virtual object to be manipulated may be specified based on the above-described first user input corresponding to the start of the manipulation. When the virtual object to be manipulated is specified based on a press point on the screen at the time of the start of the manipulation, for example, a user interface that gives a direct feeling of dragging and moving the virtual object in a three-dimensional space is realized.

Note that the type of a user input is not limited to the example described above. For example, pressing of a predetermined key or button, recognition of a touch gesture, recognition of a facial expression, recognition of a voice command, or recognition of a line of sight in a head-mounted display may be defined as a user input.

(7) Display Control Unit

The display control unit 180 generates an output image by overlaying a virtual object on an input image according to the arrangement by the manipulation control unit 170. Then, the display control unit 180 displays the generated output image on the screen of the display unit 110. A trigger to display a virtual object may be, for example, detection of any user input, reception of virtual object data from another device, recognition of some pattern in the input image, or the like.

[2-3. Manipulation Scenarios]

Next, two manipulation scenarios related to manipulation of a virtual object will be described with reference to FIGS. 11 and 12. In a first manipulation scenario, a virtual object is newly arranged as if it were being pulled out of a real object recognized in an image. In a second manipulation scenario, the arranged virtual object is moved through manipulation by a user.

(1) First Manipulation Scenario

Figure 11:
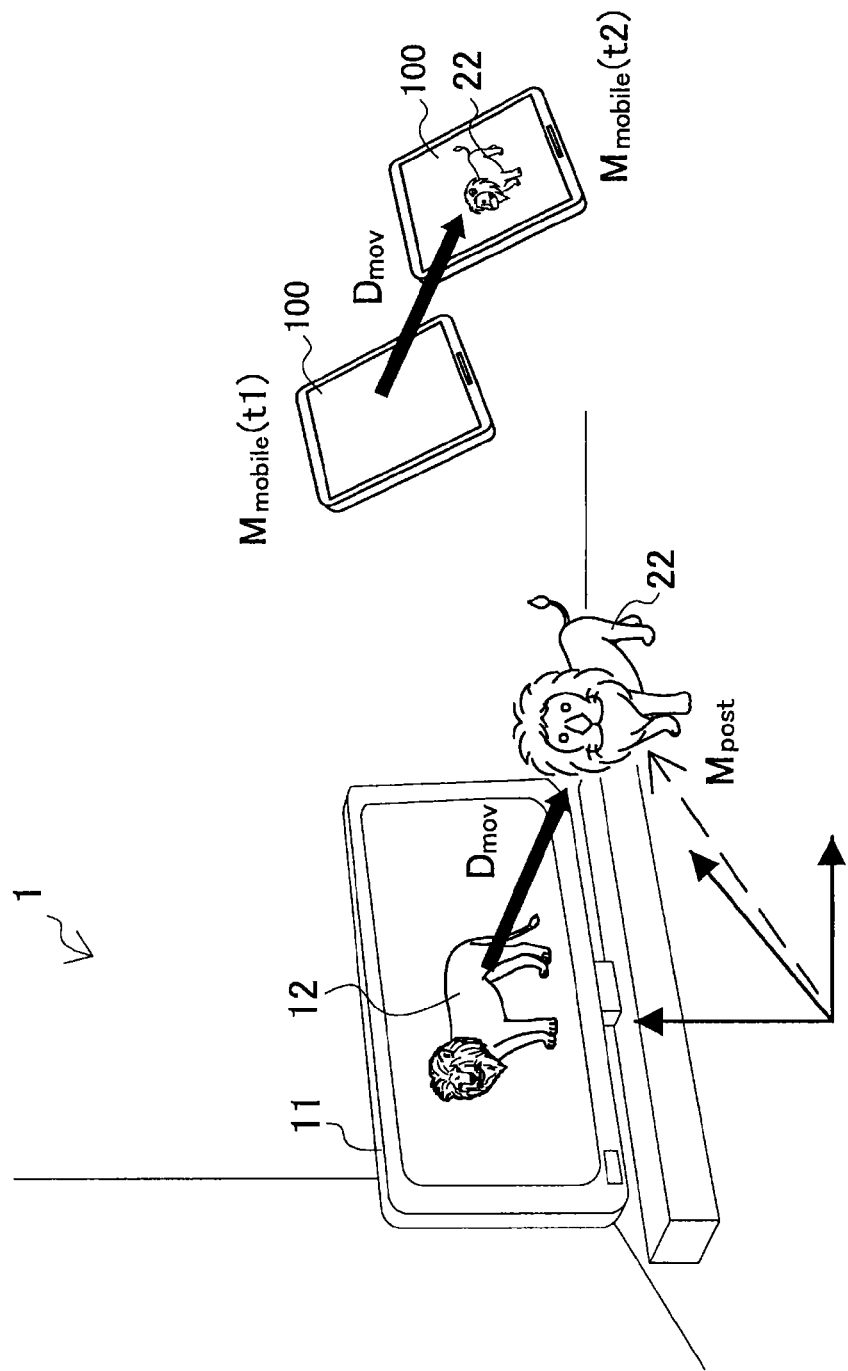
FIG. 11 is an illustrative diagram showing a state in which a virtual object is manipulated according to a first manipulation scenario.

FIG. 11 shows a state in which a new virtual object is arranged in the reference environment according to the first manipulation scenario.

In the example of FIG. 11, the real object 11 in the reference environment 1 is a digital television device. On the screen of the digital television device 11, a content image of a lion 12 is being displayed. The real object DB 150 stores feature amount data of the lion 12 in advance.

At the time t1, when a user holds the image processing device 100 over the digital television device 11, the lion 12 appears in an input image. The recognition unit 130 identifies the lion 12 appearing in the input image using the feature amount data stored in the real object DB 150. Then, the manipulation control unit 170 specifies a virtual object 22 associated with the lion 12 in the content DB 160 as a virtual object to be manipulated. The virtual object 22 is assumed to be, for example, movable in parallel.

Then, from the time t1 to the time t2, the user moves the image processing device 100 while touching the screen of the image processing device 100. Then, the manipulation control unit 170 calculates the parallel movement manipulation amount $D_{mov}$ that is the difference between the parallel movement components of the two manipulation arrangement matrixes $M_{mobile}(t1)$ and $M_{mobile}(t2)$ before and after the movement. Further, the manipulation control unit 170 calculates the post-manipulation matrix $M_{post}$ representing the position and the attitude of the virtual object 22 after manipulation from the position and the attitude of the lion 12 and the parallel movement manipulation amount $D_{mov}$. The display control unit 180 projects the virtual object 22 having the three-dimensional position and attitude represented by the post-manipulation matrix $M_{post}$ on the two-dimensional screen, thereby causing an output image on which the virtual object 22 is overlaid to be displayed.

(2) Second Manipulation Scenario

Figure 12:
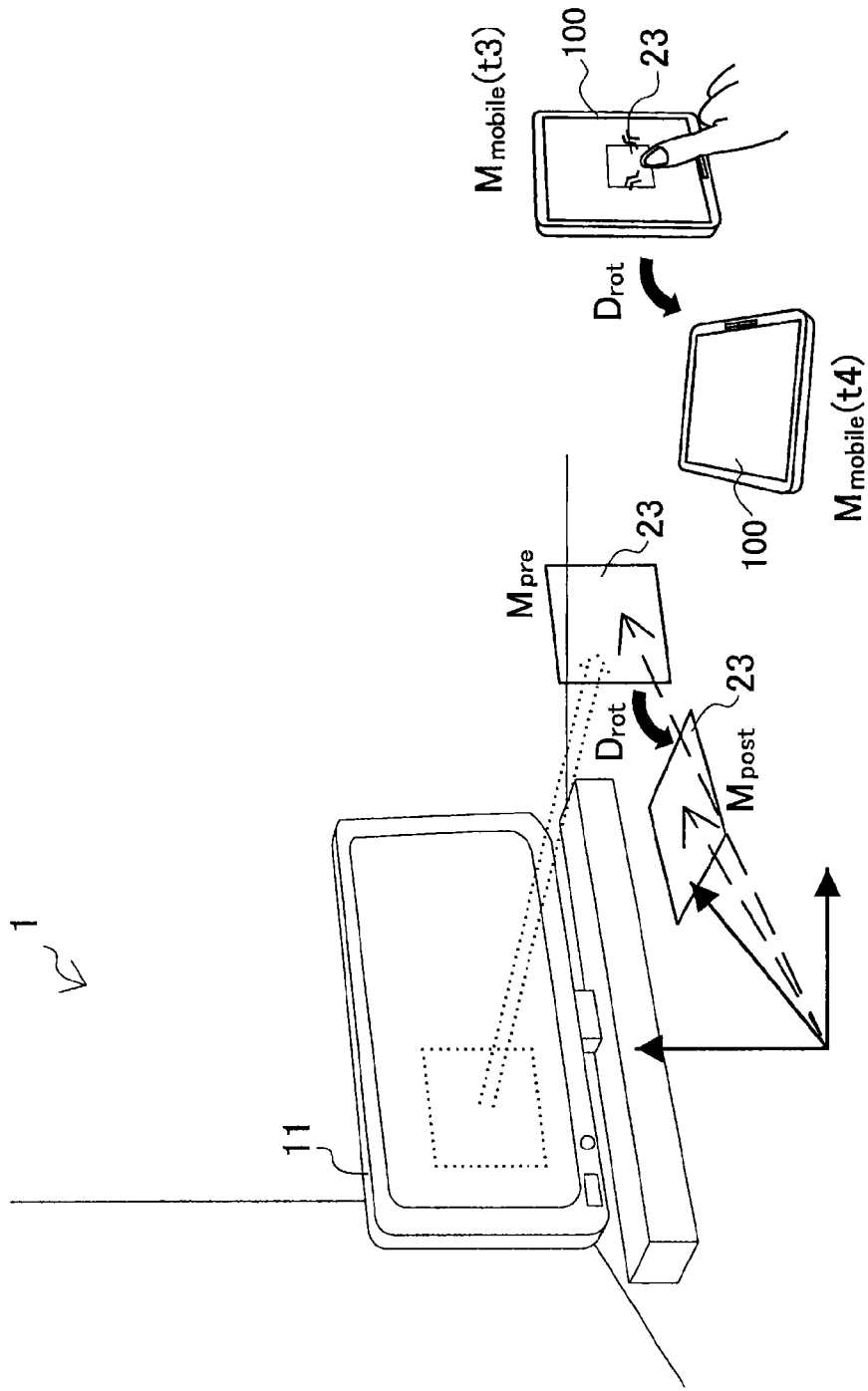
FIG. 12 is an illustrative diagram showing a state in which a virtual object is manipulated according to a second manipulation scenario.

FIG. 12 shows a state in which an arranged virtual object is manipulated by a user according to a second manipulation scenario.

In the example of FIG. 12, the real object 11 in the reference environment 1 is a digital television device. The real object DB 150 stores feature amount data of the digital television device 11 in advance. In addition, the content DB 160 stores data of a virtual object 23 associated with the digital television device 11 in advance. The virtual object 23 is, for example, a virtual panel displaying information on the digital television device 11.

At a time t3, the virtual object 23 is arranged in an AR space with a position and an attitude represented by a pre-manipulation matrix $M_{pre}$. When a user holds the image processing device 100 over the digital television device 11, the virtual object 23 is projected in an input image. Then, when the user touches the virtual object 23 on the screen, the manipulation control unit 170 specifies the virtual object 23 as a virtual object to be manipulated. The virtual object 23 is assumed to be, for example, rotatable.

After that, from the time t3 to a time t4, the user rotates the image processing device 100. Then, the manipulation control unit 170 calculates a rotation manipulation amount $D_{rot}$ that is the difference between rotation components of two manipulation arrangement matrixes $M_{mobile}(t3)$ and $M_{mobile}(t4)$ before and after movement. Then, the manipulation control unit 170 rearranges the virtual object 23 so that the virtual object 23 has a position and an attitude represented by a post-manipulation matrix $M_{post}$ computed from the pre-manipulation matrix $M_{pre}$ and the rotation manipulation amount $D_{rot}$.

[2-4. Process Flow]

Figure 13:
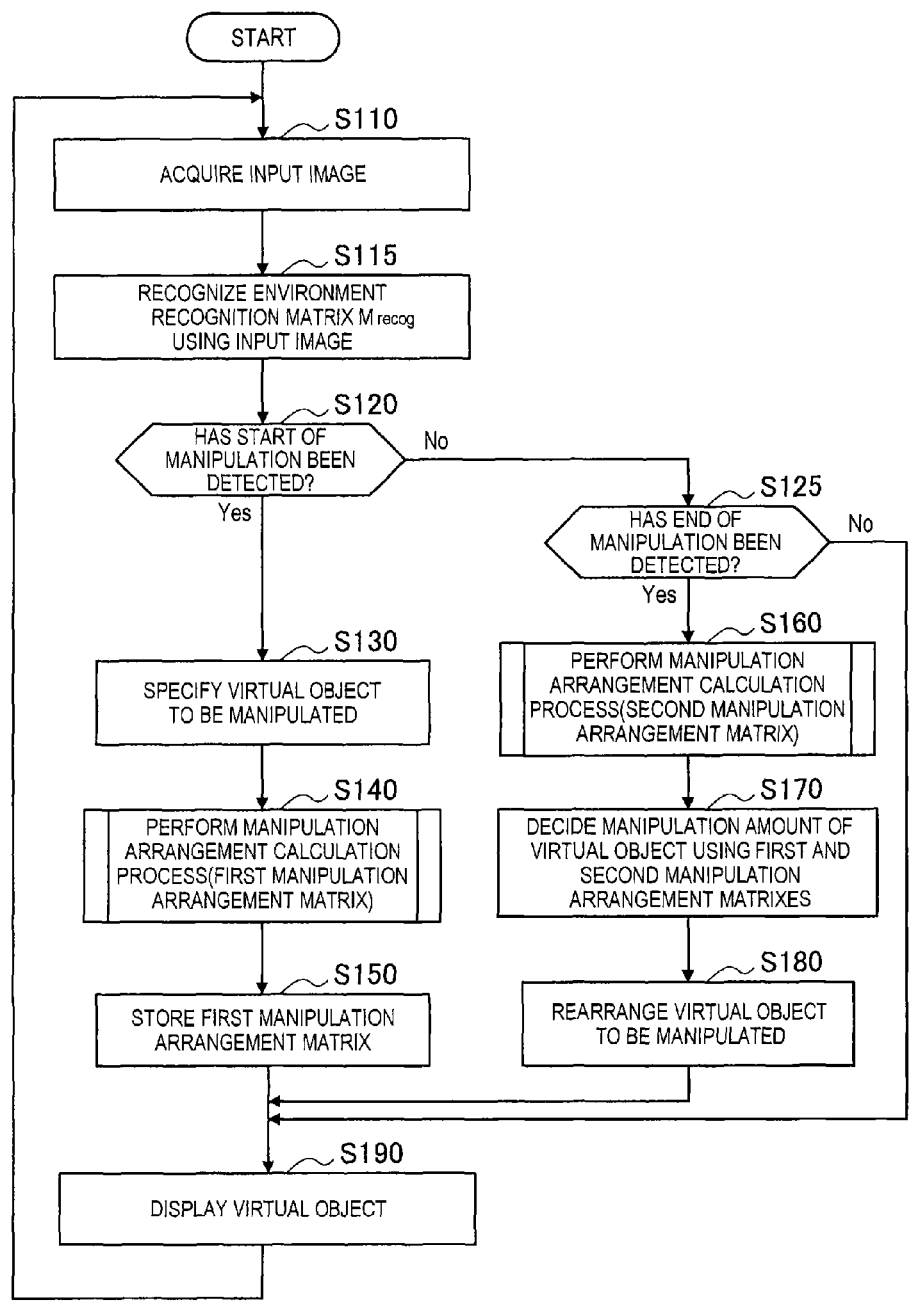
FIG. 13 is a flowchart showing an example of a flow of image processing according to an embodiment.

FIG. 13 is a flowchart showing an example of a flow of image processing performed by the image processing device 100.

Referring to FIG. 13, first, the image acquisition unit 120 acquires a captured image generated by the imaging unit 102 as an input image (Step S110). Then, the image acquisition unit 120 outputs the acquired input image to the recognition unit 130 and the display control unit 180.

Next, the recognition unit 130 recognizes the environment recognition matrix $M_{recog}$ representing the position and the attitude of the reference environment using the input image input from the image acquisition unit 120 (Step S115). Then, the recognition unit 130 outputs the recognized environment recognition matrix $M_{recog}$ to the calculation unit 140, the manipulation control unit 170, and the display control unit 180.

Next, the image processing of FIG. 13 branches according to manipulation states. First, when it is detected that a user has started a predetermined manipulation, the process proceeds to Step S130 (Step S120). In addition, when it is detected that the manipulation started by the user has ended, the process proceeds to Step S160 (Step S125). Otherwise, the process proceeds to Step S190.

Figure 14:
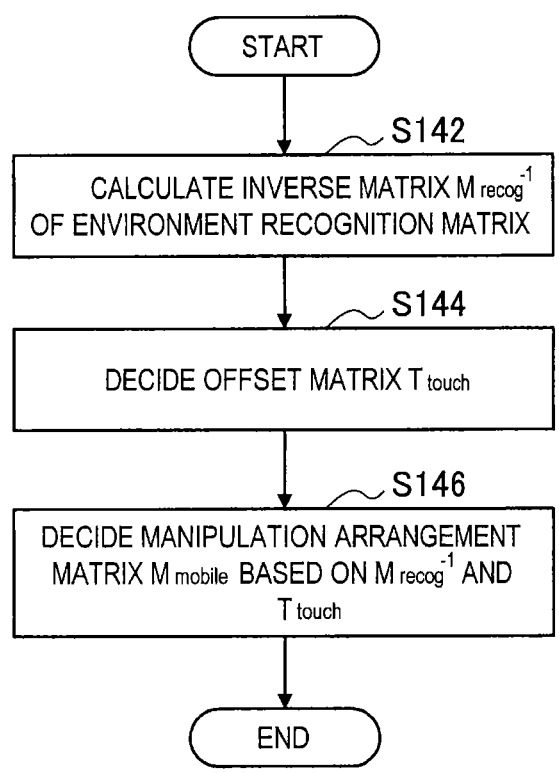
FIG. 14 is a flowchart showing an example of a detailed flow of a manipulation arrangement calculation process exemplified in FIG. 13.

In Step S130, the manipulation control unit 170 specifies a virtual object to be manipulated (Step S130). The number of virtual objects to be specified here may be one or more. Next, the manipulation arrangement calculation process that will be described using FIG. 14 is executed to calculate a first manipulation arrangement matrix (Step S140). Then, the calculated first manipulation arrangement matrix is stored (Step S150).

In Step S160, the manipulation arrangement calculation process that will be described using FIG. 14 is executed to calculate a second manipulation arrangement matrix (Step S160). Next, the manipulation control unit 170 decides a manipulation amount of the virtual object to be manipulated using the first and the second manipulation arrangement matrixes (Step S170). Then, the manipulation control unit 170 rearranges the virtual object to be manipulated according to the decided manipulation amount (Step S180).

Then, the display control unit 180 generates an output image on which the virtual object to be manipulated and another virtual object to be displayed are overlaid, and then causes the generated output image to be displayed on the screen of the display unit 110 (Step S190).

FIG. 14 is a flowchart showing an example of a detailed flow of the manipulation arrangement calculation process which corresponds to Steps S140 and S160 of FIG. 13.

Referring to FIG. 14, first, the calculation unit 140 calculates an inverse matrix $M_{recog}^{-1}$ of the environment recognition matrix input from the recognition unit 130 (Step S142). In addition, the manipulation control unit 170 decides an offset matrix $T_{touch}$ according to a user input position on the screen of the terminal (Step S144). Note that, when the offset matrix is not used, the process of Step S144 may be skipped. In addition, the manipulation control unit 170 decides a manipulation arrangement matrix $M_{mobile}$ based on the inverse matrix $M_{recog}^{-1}$ of the environment recognition matrix and the offset matrix $T_{touch}$ (Step S146).

[2-5. Variations of Display]

In the technology according to the present disclosure, a virtual object can be displayed in various forms. In this section, various display variations of a virtual object will be described.

For example, a virtual object may have a predefined reference plane. If the virtual object has a card-like planar shape, one surface of the virtual object can be defined as a reference plane and the other surface thereof can be defined as a non-reference plane. If the virtual object has a stereoscopic shape, the reference plane of the virtual object can be identified by a normal vector extending outward from the reference plane. As described above, if the virtual object has the reference plane, the display control unit 180 may change the display of the virtual object depending on whether or not the reference plane of the virtual object appears on the screen of the image processing device 100.

Figure 15:
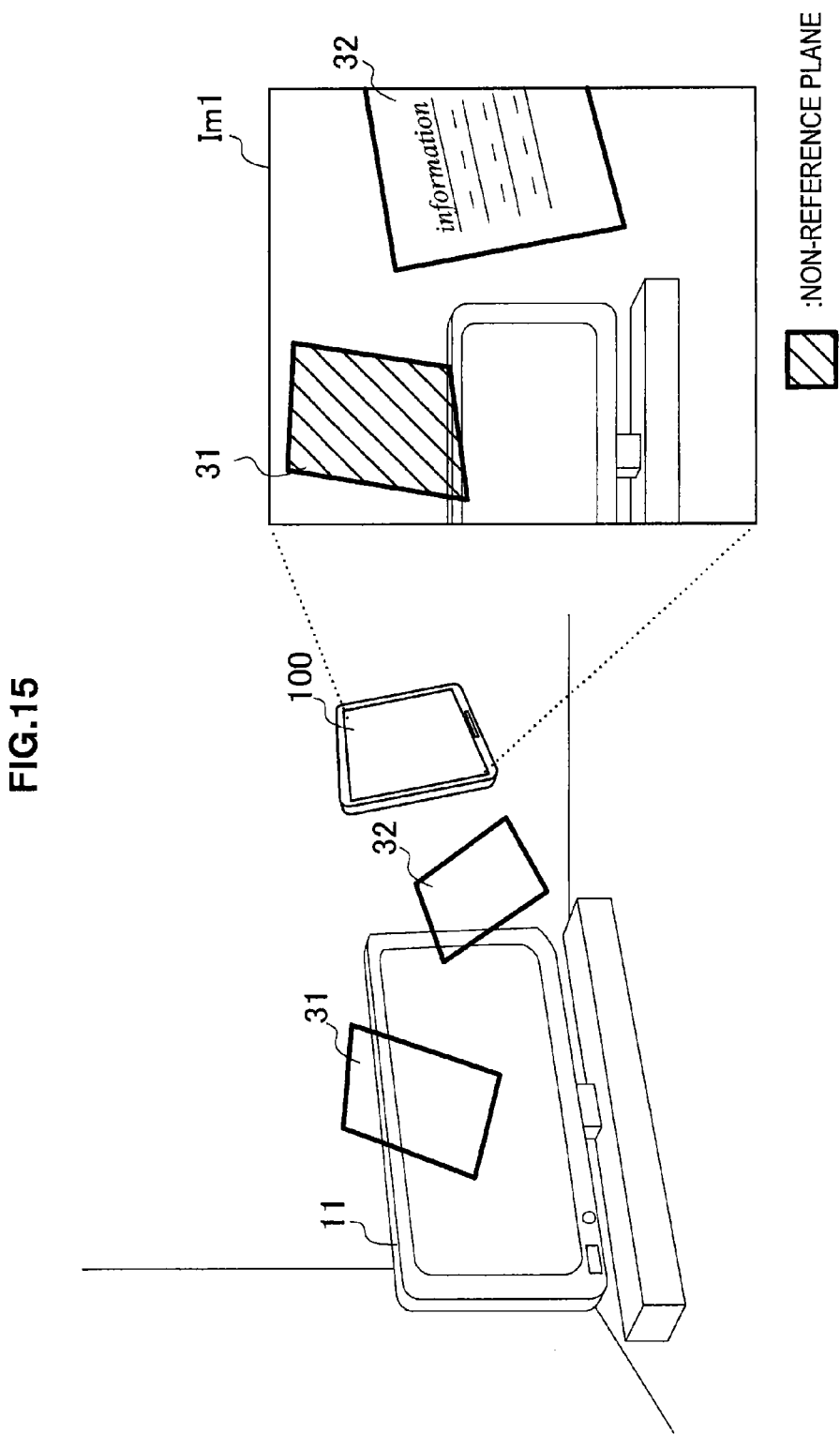
FIG. 15 is an illustrative diagram for describing determination of a reference face of a virtual object.

For example, referring to the example of FIG. 15, two virtual objects 31 and 32 appear in an output image Im1 displayed on the screen of the image processing device 100. A plane of the virtual object 31 that appears in the output image Im1 is a non-reference plane. A plane of the virtual object 32 that appears in the output image Im1 is a reference plane. Thus, the display control unit 180 can set, for example, display attributes such as the shape, scale, transparency, color, resolution, and edge thickness of the virtual object 32 to different values from those of the virtual object 31. In addition, the display control unit 180 may change the content of information indicated by the virtual objects 31 and 32 depending on whether or not a reference plane appears.

Through the display control as above, a user can easily ascertain which direction the displayed virtual object faces. In such a case, a user is assumed to desire to view the content of the information displayed on the reference plane of the virtual object 31. Without the technology according to the present disclosure, the user would have to go around to the position in which the reference plane of the virtual object 31 is seen and hold the terminal for his or her view. However, in the technology according to the present disclosure, the user three-dimensionally rotates the attitude of the virtual object 31 by merely choosing the virtual object 31 on the screen and rotating the terminal to its position, and can thereby easily view the content of the information displayed on the reference plane of the virtual object 31.

In addition, the display control unit 180 may change display of the virtual object according to the distance between the image processing device 100 and the virtual object.

Figure 16:
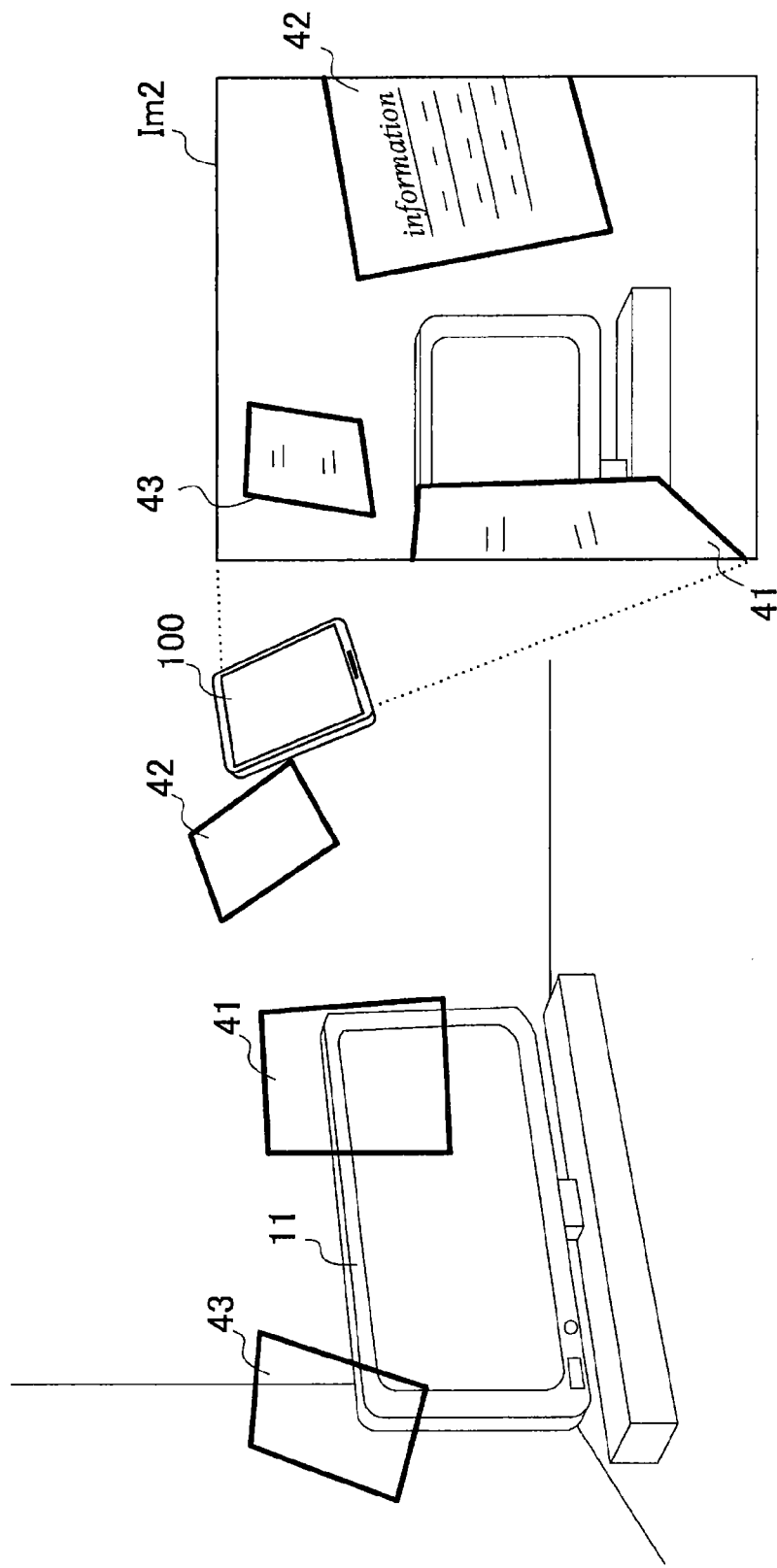
FIG. 16 is an illustrative diagram for describing display of a virtual object according to distances.

For example, referring to the example of FIG. 16, three virtual objects 41, 42, and 43 appear in an output image Im2 displayed the screen of the image processing device 100. Among them, the virtual object 43 is located farther from the image processing device 100 than are the virtual objects 41 and 42. In this case, the display control unit 180 can emphasize display attributes of the virtual objects 41 and 42 so that, for example, the virtual objects 41 and 42 can be more clearly recognized by the user. In addition, the display control unit 180 may display more detailed content of information on the virtual objects 41 and 42.

Through the aforementioned display control, it is possible to increase the visibility of a virtual object (or displayed content thereof) in which the user is more interested (i.e., to which the terminal is closer) under the condition that a number of virtual objects are displayed on the screen. In such a case, the user is assumed to desire to view detailed content of information displayed by the virtual object 43. Without the technology according to the present disclosure, the user would have to hold the terminal for his or her view while bringing the terminal closer to the virtual object 43. However, in the technology according to the present disclosure, the user moves the position of the virtual object 43 near merely by choosing the virtual object 43 on the screen and making a motion of drawing the terminal, and can thereby view more detailed content of the information displayed by the virtual object 43.

The display control unit 180 may, when a predetermined condition is satisfied, re-arrange a plurality of virtual objects to be displayed so that the plurality of virtual objects are aligned with a predetermined space therebetween.

Figure 17:
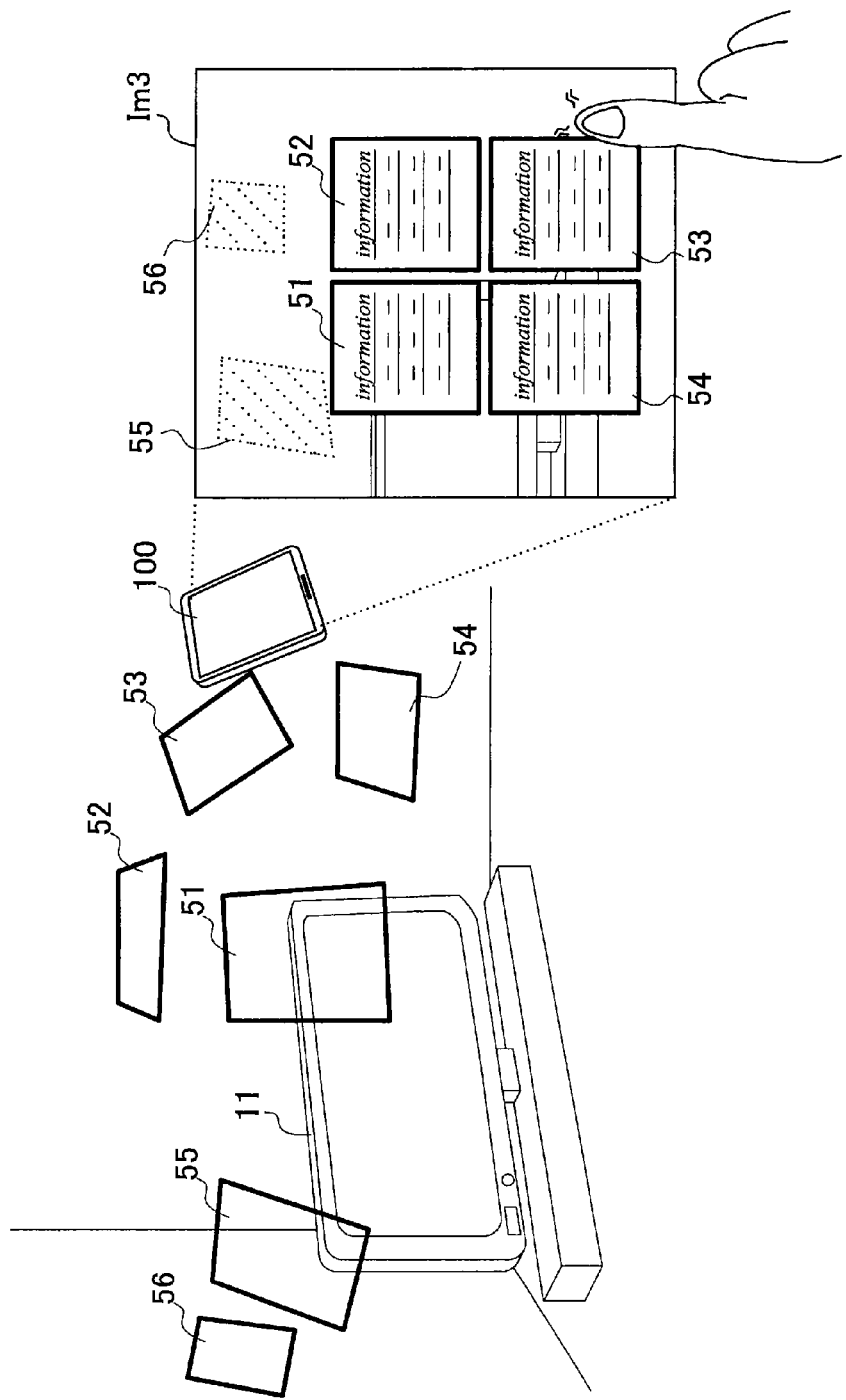
FIG. 17 is an illustrative diagram for describing alignment display of a virtual object.

For example, referring to the example of FIG. 17, six virtual objects 51 to 56 appear on the screen of the image processing device 100. However, when such virtual objects are displayed according to their arrangements, the virtual objects would be congested within the screen, and the visibility of the virtual objects would decrease. Thus, for example, the display control unit 180, when a predetermined user input is detected, aligns the virtual objects. In the example of FIG. 17, four virtual objects 51, 52, 53, and 54 located closer to the image processing device 100 are re-arranged so that they are aligned with a predetermined space therebetween. The predetermined condition for re-arranging the virtual objects may be that, instead of a user input, the number of virtual objects within the screen should be greater than a predetermined threshold, for example.

Through the aforementioned display control, it is possible to increase the visibility of content of information indicated by each virtual object under the circumstance in which a number of virtual objects are displayed on the screen. The manipulation control unit 170 may control manipulation of virtual objects aligned as above according to the above-described mechanism.

[2-6. Sharing of a Virtual Object]

In description provided so far, the same terminal is used in manipulation of a virtual object and display of a virtual object to be manipulated. However, the technology according to the present disclosure is not limited to the example. For example, a virtual object manipulated using a certain terminal may be displayed on a screen of another terminal. In the present section, such sharing of a virtual object will be described.

Figure 18:
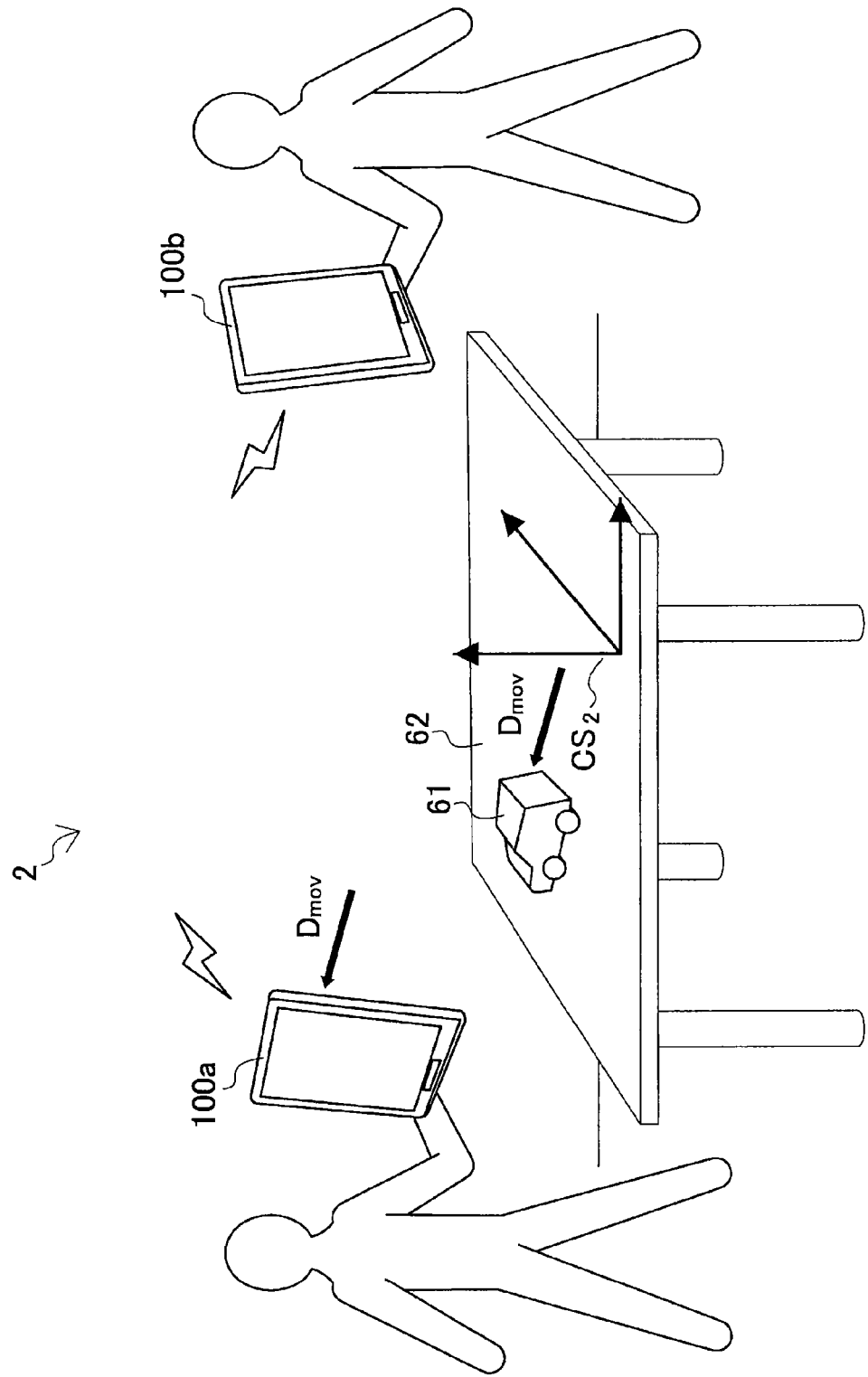
FIG. 18 is a first illustrative diagram for describing sharing of a virtual object.

Referring to FIG. 18, an image processing system that includes an image processing device 100*a* and an image processing device 100*b* for sharing a virtual object between users is shown.

For example, the image processing device 100*a* decides arrangement of the virtual object in a reference environment 2 having a reference coordinate system $CS_2$ in response to manipulation by the user based on the above-described mechanism. In the example of FIG. 18, a virtual object 61 that resembles a car is arranged on a table 62 that is a real object. The virtual object 61 can move, for example, in a manipulation amount (for example, a parallel movement manipulation amount $D_{mov}$) decided by the image processing device 100*a*. The image processing device 100*a* transmits data representing the arrangement of the virtual object 61 (for example, the above-described post-manipulation matrix $M_{post}$) to the image processing device 100*b*. The image processing device 100*b* recognizes an environment recognition matrix representing the position and the attitude of the reference environment 2 appearing in an input image, and then overlays the virtual object 61 on the input image using the recognized environment recognition matrix and the post-manipulation matrix $M_{post}$ received from the image processing device 100*a*.

In the example of FIG. 18, the environment 2 corresponding to a single space including the table 62 is shown as a reference environment. However, the reference environment to which the technology according to the present disclosure is applied is not limited thereto. For example, even when a space in which the image processing device 100*a* is present differs from a space in which the image processing device 100*b* is present, if a feature point group or an object that is shared in the two spaces is present, or if calibrated coordinate systems that can be viewed as the same exist, it is possible to handle a plurality of environments corresponding to the spaces as a single common reference environment. Alternatively, environments that are recognized at different times in a single space may be handled as a single common reference environment.

Figure 19A:
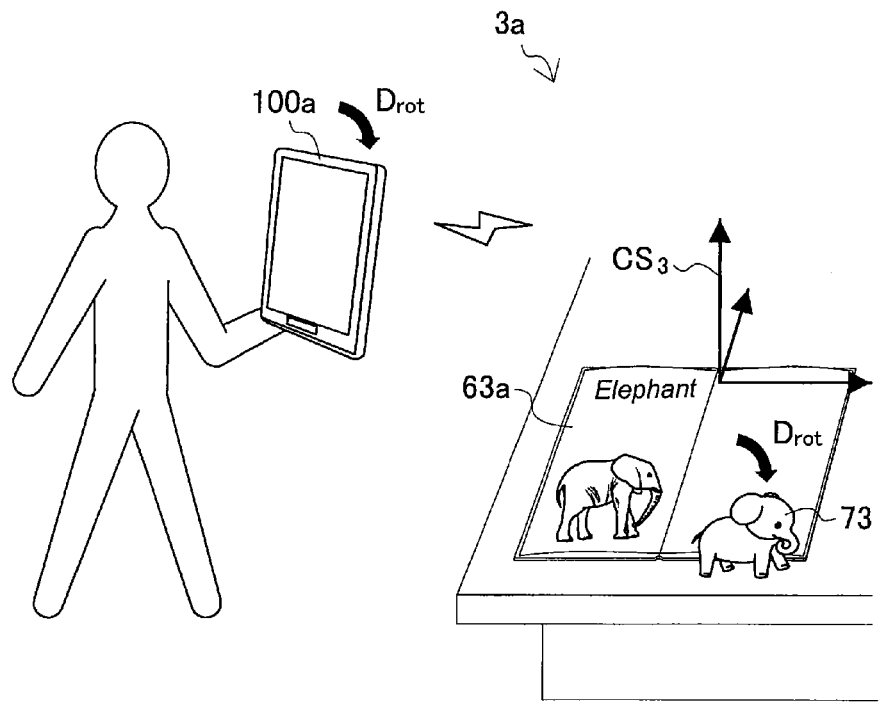
FIG. 19A is a second illustrative diagram for describing sharing of a virtual object.
Figure 19B:
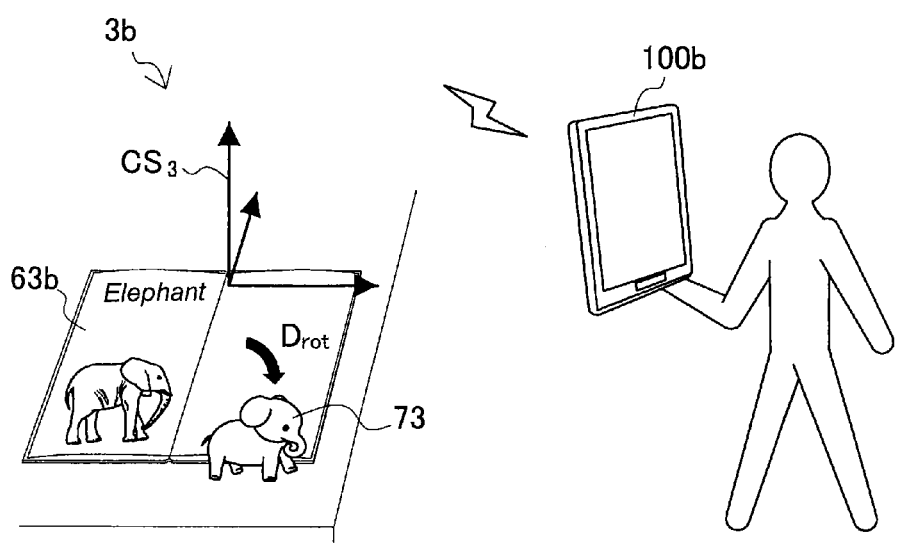
FIG. 19B is a third illustrative diagram for describing sharing of a virtual object.

For example, referring to FIG. 19A, the image processing device 100*a* and a book 63*a* are present in an environment 3*a*. Referring to FIG. 19B, the image processing device 100*b* and a book 63*b* are present in an environment 3*b*. The book 63*a* and the book 63*b* have a common feature point group. Thus, the image processing devices 100*a* and 100*b* recognize one common reference coordinate system $CS_3$ using the feature point group, and can share a virtual object associated with the reference coordinate system $CS_3$. In the example of FIG. 19A, a virtual object 73 that resembles an elephant is arranged near the book 63*a*. The virtual object 73 can rotate in, for example, a manipulation amount (for example, a rotation manipulation amount $D_{rot}$) decided by the image processing device 100*a*. The image processing device 100*b* transmits data representing the arrangement of the virtual object 73 (for example, the above-described post-manipulation matrix $M_{post}$) to the image processing device 100*b*. The image processing device 100*b* recognizes the environment recognition matrix representing the position and the attitude of the reference environment 3*b* appearing in the input image, and then displays an output image on which the virtual object 73 is overlaid using the recognized environment recognition matrix and the post-manipulation matrix $M_{post}$ received from the image processing device 100*a*.

<3. Conclusion>

Embodiments of the technology according to the present disclosure have been described above in detail with reference to FIGS. 1 to 19B. According to the embodiments described above, an environment recognition matrix representing a position and an attitude of an environment is recognized with respect to a position and an attitude of a terminal in a reference environment, and the position and the attitude of the terminal are represented based on an inverse matrix of the recognized environment recognition matrix. Then, a virtual object arranged in the reference environment is manipulated in a three-dimensional manipulation amount based on the difference of one or both of the position and the attitude of the terminal at two time points. Thus, a user can freely manipulate the virtual object in an AR space in a three-dimensional manner by moving the terminal in a three-dimensional space. When a mobile terminal is used, for example, the user can three-dimensionally move the virtual object and can three-dimensionally rotate the virtual object by holding and moving the mobile terminal.

In addition, according to the embodiments described above, a virtual object to be manipulated is specified based on a user input position on a screen at the time of starting a series of manipulations. Thereby, a user interface that gives a direct feeling of dragging and moving the virtual object in a three-dimensional space can be realized.

Note that a series of control processes performed by each device described in the present specification can be implemented using any of software, hardware, or a combination of software and hardware. A program that constitutes software is stored in advance in a storage medium that is provided in the inside or outside of each device. Then, each program is, for example, read into a RAM (Random Access Memory) at the time of execution and executed by a processor like a CPU.

In addition, some of logical functions of each device may be, instead of being implemented on the device, implemented on a device that exists in a cloud computing environment. In such a case, information exchanged between the logical functions can be transmitted or received between the devices via the communication unit 112 exemplarily shown in FIG. 9.

Although the preferred embodiments of the present disclosure have been described in detail with reference to the appended drawings hereinabove, the technical scope of the present disclosure is not limited thereto. It is obvious that those who have general knowledge in the technical field of the present disclosure can conceive various modifications or alterations insofar as they are within the technical gist of the appended claims, and such modifications or alterations of course come under the technical scope of the present disclosure.

Additionally, the present technology may also be configured as below.

(1)

An image processing device including:

a recognition unit configured to recognize an environment recognition matrix representing a position and an attitude of an environment appearing in an image with respect to a position and an attitude of a terminal that has captured the image;

a calculation unit configured to calculate an inverse matrix of the environment recognition matrix; and a manipulation control unit configured to control manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

(2)

The image processing device according to (1), wherein the manipulation amount is a parallel movement amount according to the difference between the first position and the second position.

(3)

The image processing device according to (1), wherein the manipulation amount is a rotation amount according to the difference between the first attitude and the second attitude.

(4)

The image processing device according to any one of (1) to (3), wherein the first time point is a time point at which a first user input is detected in the terminal, and wherein the second time point is a time point at which a second user input is detected in the terminal.

(5)

The image processing device according to (4), wherein the first user input and the second user input correspond to a start and an end of a series of manipulations, respectively.

(6)

The image processing device according to (4) or (5), wherein the first position or the second position is a position offset in a direction on a screen of the terminal according to a user input position on the screen.

(7)

The image processing device according to any one of (4) to (6), wherein the manipulation control unit specifies the virtual object to be manipulated based on the first user input.

(8)

The image processing device according to (7), wherein the manipulation control unit specifies a virtual object associated with a real object in the environment specified through the first user input as the virtual object to be manipulated.

(9)

The image processing device according to any one of (1) to (8), wherein at least one of the recognition unit, the calculation unit, and the manipulation control unit is realized by a device present in a cloud computing environment instead of the image processing device.

(10)

An image processing method including:

recognizing an environment recognition matrix representing a position and an attitude of an environment appearing in an image with respect to a position and an attitude of a terminal that has captured the image;

calculating an inverse matrix of the environment recognition matrix; and controlling manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

(11)

A program causing a computer to function as:

a recognition unit configured to recognize an environment recognition matrix representing a position and an attitude of an environment appearing in an image with respect to a position and an attitude of a terminal that has captured the image;

a calculation unit configured to calculate an inverse matrix of the environment recognition matrix; and a manipulation control unit configured to control manipulation of a virtual object arranged in the environment in a three-dimensional manipulation amount according to a difference between a first position or a first attitude based on the inverse matrix of the environment recognition matrix recognized at a first time point and a second position or a second attitude based on the inverse matrix of the environment recognition matrix recognized at a succeeding second time point.

REFERENCE SIGNS LIST

100 image processing device (terminal)
120 image acquisition unit
130 recognition unit
140 calculation unit
170 manipulation control unit
180 display control unit

The invention claimed is:

1. An image processing device comprising:
   circuitry configured to:
   recognize an environment recognition matrix representing a position and an attitude of an environment appearing in an image with respect to a position and an attitude of a terminal that has captured the image;
   calculate an inverse matrix of the environment recognition matrix; and
   control manipulation of a virtual object arranged in the environment appearing in the image captured by the terminal in a three-dimensional manipulation amount according to a difference between a first position or a first attitude of the terminal that has captured the image based on the inverse matrix of the environment recognition matrix recognized at a first time point and a second position or a second attitude of the terminal that has captured the image based on the inverse matrix of the environment recognition matrix recognized at a succeeding second time point.

2. The image processing device according to claim 1, wherein the manipulation amount is a movement amount according to the difference between the first position and the second position.

3. The image processing device according to claim 1, wherein the manipulation amount is a rotation amount according to the difference between the first attitude and the second attitude.

4. The image processing device according to claim 1,
   wherein the first time point is a time point at which a first user input is detected in the terminal, and
   wherein the second time point is a time point at which a second user input is detected in the terminal.

5. The image processing device according to claim 4, wherein the first user input and the second user input correspond to a start and an end of a series of manipulations, respectively.

6. The image processing device according to claim 4, wherein the first position or the second position is a position offset in a direction on a screen of the terminal according to a user input position on the screen.

7. The image processing device according to claim 4, wherein the circuitry is configured to specify the virtual object to be manipulated based on the first user input.

8. The image processing device according to claim 7, wherein the circuitry is configured to specify a virtual object associated with a real object in the environment specified through the first user input as the virtual object to be manipulated.

9. The image processing device according to claim 1, wherein at least one of functions performed by the circuitry is realized by a device present in a cloud computing environment instead of the image processing device.

10. An image processing method comprising:
   recognizing an environment recognition matrix representing a position and an attitude of an environment appearing in an image with respect to a position and an attitude of a terminal that has captured the image;
   calculating an inverse matrix of the environment recognition matrix; and
   controlling, using circuitry, manipulation of a virtual object arranged in the environment appearing in the image captured by the terminal in a three-dimensional manipulation amount according to a difference between a first position or a first attitude of the terminal that has captured the image based on the inverse matrix of the environment recognition matrix recognized at a first time point and a second position or a second attitude of the terminal that has captured the image based on the inverse matrix of the environment recognition matrix recognized at a succeeding second time point.

11. A non-transitory computer readable medium including executable instructions, which when executed by a computer cause the computer to:
   recognize an environment recognition matrix representing a position and an attitude of an environment appearing in an image with respect to a position and an attitude of a terminal that has captured the image;
   calculate an inverse matrix of the environment recognition matrix; and
   control manipulation of a virtual object arranged in the environment appearing in the image captured by the terminal in a three-dimensional manipulation amount according to a difference between a first position or a first attitude of the terminal that has captured the image based on the inverse matrix of the environment recognition matrix recognized at a first time point and a second position or a second attitude of the terminal that has captured the image based on the inverse matrix of the environment recognition matrix recognized at a succeeding second time point.

* * * * *